United States Patent
Kneckt et al.

(10) Patent No.: US 12,267,766 B2
(45) Date of Patent: Apr. 1, 2025

(54) MLD PRIVACY AND OPERATION ENHANCEMENTS

(71) Applicant: Apple Inc., Cupertino, CA (US)

(72) Inventors: Jarkko L. Kneckt, Los Gatos, CA (US); Yong Liu, Campbell, CA (US); Su Khiong Yong, Palo Alto, CA (US); Jinjing Jiang, San Jose, CA (US); Tianyu Wu, Fremont, CA (US); Qi Wang, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 316 days.

(21) Appl. No.: 17/527,873

(22) Filed: Nov. 16, 2021

(65) Prior Publication Data
US 2022/0167256 A1    May 26, 2022

Related U.S. Application Data

(60) Provisional application No. 63/116,649, filed on Nov. 20, 2020.

(51) Int. Cl.
| | | |
|---|---|---|
| *H04W 4/00* | (2018.01) | |
| *H04W 12/106* | (2021.01) | |
| *H04W 48/16* | (2009.01) | |

(52) U.S. Cl.
CPC ......... *H04W 48/16* (2013.01); *H04W 12/106* (2021.01)

(58) Field of Classification Search
CPC ............................ H04W 48/16; H04W 12/106
USPC ............................................ 370/329; 455/434
See application file for complete search history.

(56) References Cited

U.S. PATENT DOCUMENTS

| | | | |
|---|---|---|---|
| 2010/0122088 A1* | 5/2010 | Oxford | H04L 63/0478 380/278 |
| 2019/0268956 A1* | 8/2019 | Xiao | H04W 74/006 |
| 2019/0335454 A1* | 10/2019 | Huang | H04W 72/542 |
| 2020/0221545 A1* | 7/2020 | Stacey | H04W 48/16 |
| 2021/0045175 A1* | 2/2021 | Huang | H04L 5/0055 |
| 2021/0315042 A1* | 10/2021 | Ouzieli | H04W 12/0433 |
| 2021/0321410 A1 | 10/2021 | Patil et al. | |
| 2021/0368322 A1* | 11/2021 | Seok | H04W 12/041 |

FOREIGN PATENT DOCUMENTS

| | | |
|---|---|---|
| CN | 101383757 | 3/2009 |
| CN | 110519862 | 11/2019 |
| CN | 111294286 | 6/2020 |
| CN | 111432044 | 7/2020 |
| CN | 111641970 | 9/2020 |

(Continued)

OTHER PUBLICATIONS

Extended European Search Report for EP Patent Application No. 21209278.7; 10 pages; Mar. 31, 2022.

(Continued)

*Primary Examiner* — Temica M Beamer
(74) *Attorney, Agent, or Firm* — Kowert, Hood, Munyon, Rankin & Goetzel, P.C.

(57) ABSTRACT

Methods for performing robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

20 Claims, 31 Drawing Sheets

(56) References Cited

FOREIGN PATENT DOCUMENTS

| CN | 111683413 | 9/2020 |
|---|---|---|
| CN | 111741459 | 10/2020 |
| CN | 111741500 | 10/2020 |
| DE | 11 2022 003 192 | 4/2024 |
| GB | 2621740 | 2/2024 |
| WO | 2021228085 A1 | 11/2021 |
| WO | 2022010260 A1 | 1/2022 |

OTHER PUBLICATIONS

Kneckt et al. "AP MLD Beaconing and Discovery"; IEEE 802.11-20/865r2; 28 pages; Jul. 29, 2020.
Qi et al. "Beacon Protection—for CID 2116 and CID2673"; IEEE 802.11-19/0314r0; 24 pages; Mar. 8, 2019.
AU "Specification Framework for TGbe"; IEEE 802.11-19/1262r20; 88 pages; Nov. 10, 2020.
First Office Action for CN Application No. 202111401482.8; Jan. 17, 2024.
Zhao et al. "Switching Strategy of Wireless Mesh Network Channel Based on Selective Scanning"; Journal of Hunan University of Technology, vol. 01; Jan. 15, 2016.
Notice of Intent to Grant for EP 21209278.7; Oct. 4, 2024.

* cited by examiner

| Header | Timestamp | Interval | $IE_1,...,IE_{n-1}$ | MME |

FIG. 7A

| Element ID | Length | Key ID | BIPN | MIC |

FIG. 7B

| Element ID | Length | Key ID | PRPN | MIC |

FIG. 7C

| Operation Mode | Discovery | AP and Link Quality Assessment | Link Setup |
|---|---|---|---|
| Default AP Mode (Legacy Mode) | AP information included to all APs in AP MLD; AP is discoverable | Scanning in all links or ML probe request possible; fast operation | All links may be setup in 1-phase setup |
| Hidden AP Mode | Hidden AP is discoverable only on its link; discovery may be slow | May take time; only link to primary AP is assessed | Secondary Aps are likely setup in post association state |
| Encrypted/No Beacon Mode | Not discoverable; only primary AP is discoverable | Link assessment only with primary AP; secondary Aps are assessed in post-association state | Secondary Aps can be setup only in post association state |

FIG. 16

| B0 | B1 | B2 | B3 | B4 | B5 | B6 | B7 |
|---|---|---|---|---|---|---|---|
| Preferred Candidate List Included | Abridged | Disassociation Imminent | BSS Termination Included | ESS Disassociation Imminent | AP MLD Termination Included | New AP to Be Added | Reserved |

FIG. 18

MLD PRIVACY AND OPERATION ENHANCEMENTS

PRIORITY DATA

This application claims benefit of priority to U.S. Provisional Application Ser. No. 63/116,649, titled "MLD Privacy and Operation Enhancements", filed Nov. 20, 2020, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (and/or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (and/or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (and/or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

SUMMARY

Embodiments described herein relate to systems, methods, and mechanisms for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD. Note that in embodiments described herein "robust" may refer to wireless communication that can withstand intentional or unintentional disturbances, such as technical faults, signal disturbances, and/or security threats.

For example, a wireless station may be configured to associate with an access point that may be included in and/or associated with a multi-link device (MLD). The wireless station may be configured to transmit, to the access point, a robust query request and receive, from the access point a robust query response. The robust query response may include an integrity protected broadcast probe response and may use a temporal key and/or packet number for verification.

As another example, a wireless station may be configured to associate with an access point that may be included in and/or associated with a multi-link device (MLD). The wireless station may be configured to transmit, to the access point, an add link request. The add link request may request an addition of a new link between the wireless station and the access point. Further, the wireless station may be configured to establish, with the access point, security for the new link, including one or more of (e.g., any combination of, including at least one of and/or all of) of a Beacon Integrity GTK (BIGTK) secure architecture (BIGTKSA), an Integrity GTK secure architecture (IGTKSA), a GTK secure architecture (GTKSA), or a peer wise transient key (PTK) secure architecture (PTKSA) for the added new link.

As a further example, a wireless station may be configured to associate with an access point that may be included in and/or associated with a multi-link device (MLD). The wireless station may be configured to transmit, to the access point, an add link request. The add link request may indicate a MAC address associated with a link, a new MLD MAC address sequence number offset, and a timing synchronization function (TSF) of an update to the MAC address. Further, the wireless station may be configured receive, from the access point, an add link response. The add link response may indicate the MAC address associated with the link, the new MLD MAC address sequence number offset, and the TSF of the update to the MAC address.

As yet another example, an access point may be configured to receive, from a wireless station, a MAC protocol data unit (PDU) over a link with the wireless station. The access point may be configured to determine whether parameters associated with the MAC PDU are parameters used prior to a parameters change time or parameters used after the parameters change time. Further, in response to determining that the parameters are parameters used prior to the parameters change time, the access point may be configured to determine whether the MAC PDU was transmitted during a tolerance period associated with the parameters change time. Additionally, in response to determining that the MAC PDU was transmitted during the tolerance period, the access point may be configured to determine a sequence number of the MAC PDU using a sequence number offset associated with the parameters used prior to the parameters change time.

As further examples, an access point may be configured to operate in one of a plurality of operational and/or beacon modes. For example, in a first operational and/or beacon mode, the access point may be discoverable via any link of the MLD. As another example, in a second operational and/or beacon mode, the access point may be discoverable only on its primary channel. As a further example, in a third operational and/or beacon mode, the access point may be visible only to selected wireless stations that know the access point's beacon encryption key. As yet another example, in a fourth operational and/or beacon mode, the access point may be transitioning to an off phase and safely closing links.

As yet a further example, an access point may be configured to associate with a wireless station. The access point may be included in a multi-link device (MLD). The access point may be configured to receive, from the wireless station, a BTM query that may propose addition of a second access point to the MLD. Thus, the access point may be configured to send (or transmit), to the second access point, a start new access point (AP) in AP MLD request and receive, from the second access point, a new AP created response. The access point may also be configured to send (or transmit), to the wireless station, a BTM request that includes a candidate BSS list that may include the second access point.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 7A illustrates an example of an integrity protected broadcast probe response, according to some embodiments.

FIGS. 7B and 7C illustrate examples of a Management Encapsulation element (MME), according to some embodiments.

FIG. 16 further illustrates distinctions for various AP operational modes, according to some embodiments.

FIG. 18 illustrates a request mode field of a BTM request, according to some embodiments.

Figure 1A:
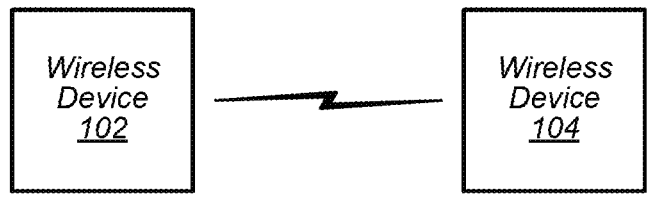
FIG. 1A illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
STA: Wireless Station TX: Transmission/Transmit
RX: Reception/Receive
LAN: Local Area Network
WLAN: Wireless LAN
RAT: Radio Access Technology
ACK: Acknowledgment
BA: Block Acknowledgment
NAKC: Negative Acknowledgment
N-BA: Negative Block Acknowledgment
TSF: Timing Synchronization Function
QoS: Quality of Service Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (and/or combination of devices) having at least one processor that executes instructions from a memory medium.

Mobile Device (and/or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (and/or combination of devices) which is easily transported by a user and capable of wireless communication using WLAN or Wi-Fi.

Wireless Device (and/or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (and/or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
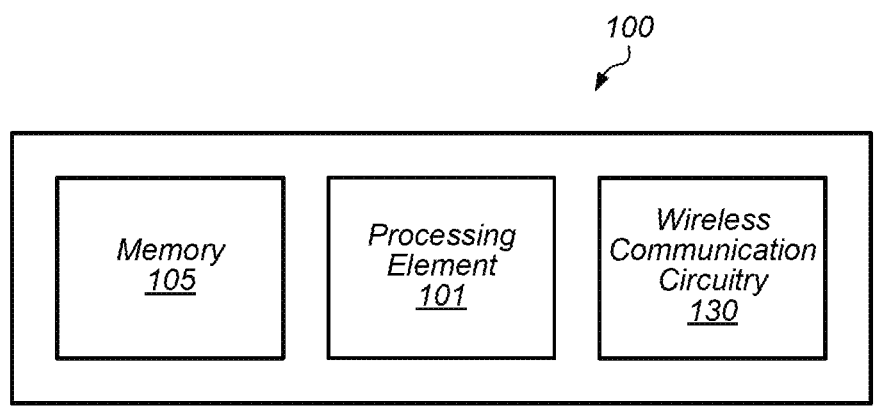
FIG. 1B illustrates an example simplified block diagram of a wireless device, according to some embodiments.

FIGS. 1A-1B—Wireless Communication System

FIG. 1A illustrates an exemplary (and simplified) wireless communication system in which aspects of this disclosure may be implemented. It is noted that the system of FIG. 1A is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, handheld device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1A. For example, a wireless device (e.g., either of wireless devices 102 or 104) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

FIG. 1B illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 10. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (and/or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

Figure 1C:
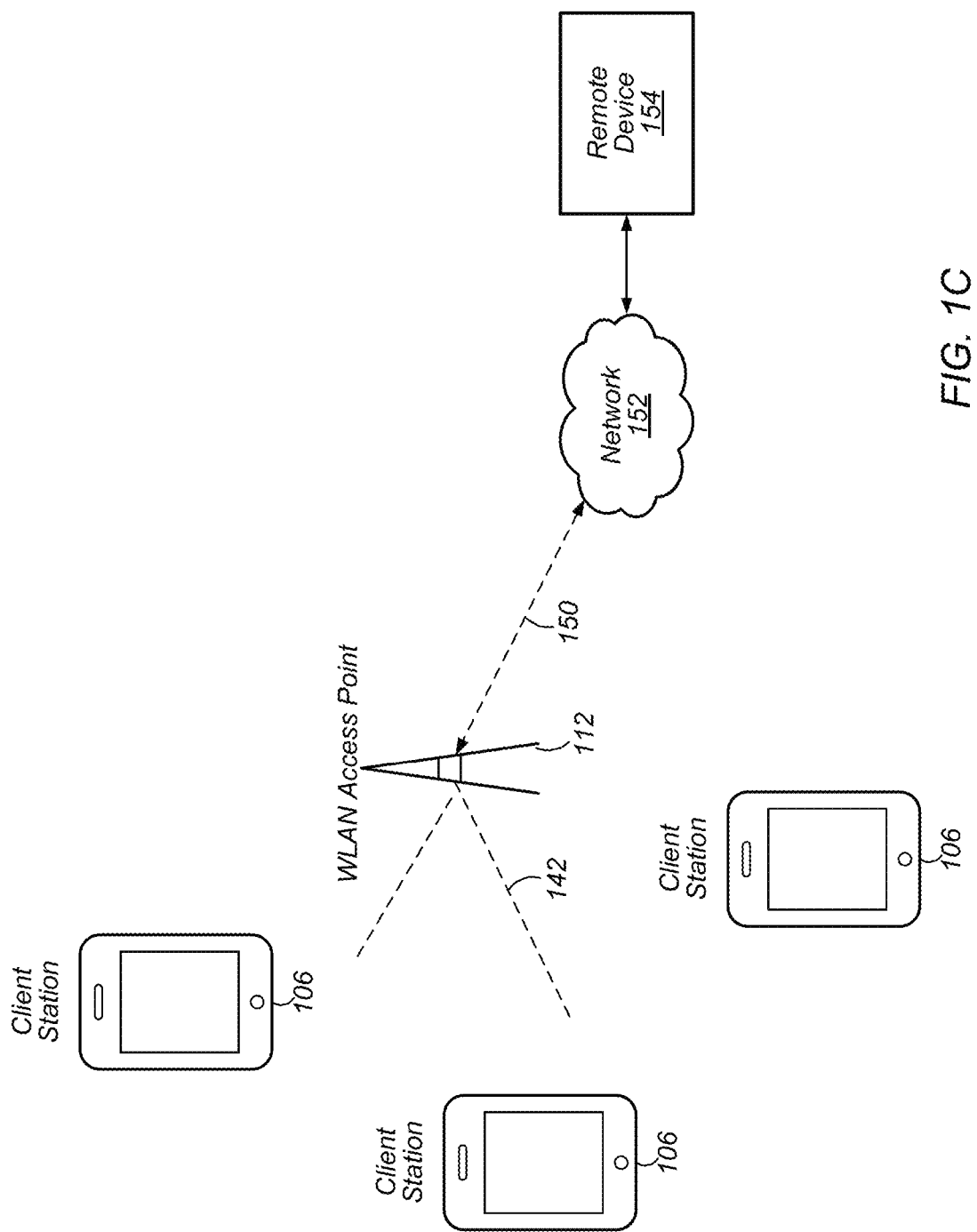
FIG. 1C illustrates an example WLAN communication system, according to some embodiments.

FIG. 1C—WLAN System

FIG. 1C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, a wireless device 106 (which may be an exemplary implementation of device 100) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 2:
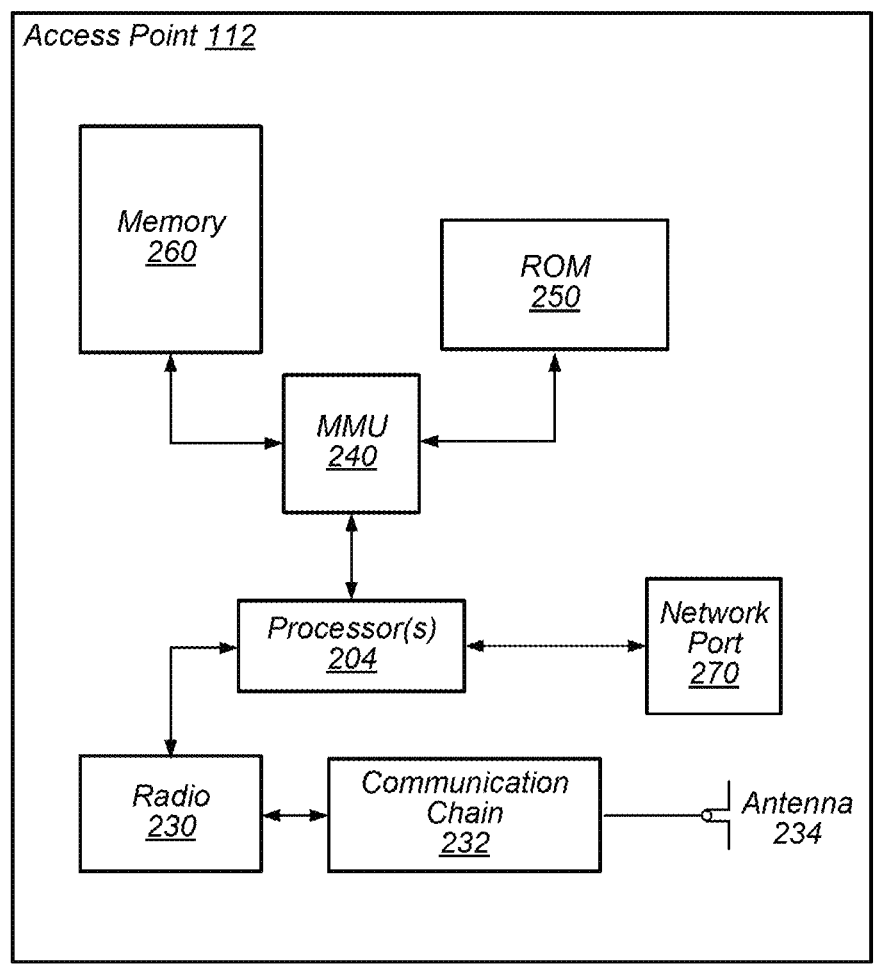
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112, which may be one possible exemplary implementation of the device 100 illustrated in FIG. 1B. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (and/or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 3:
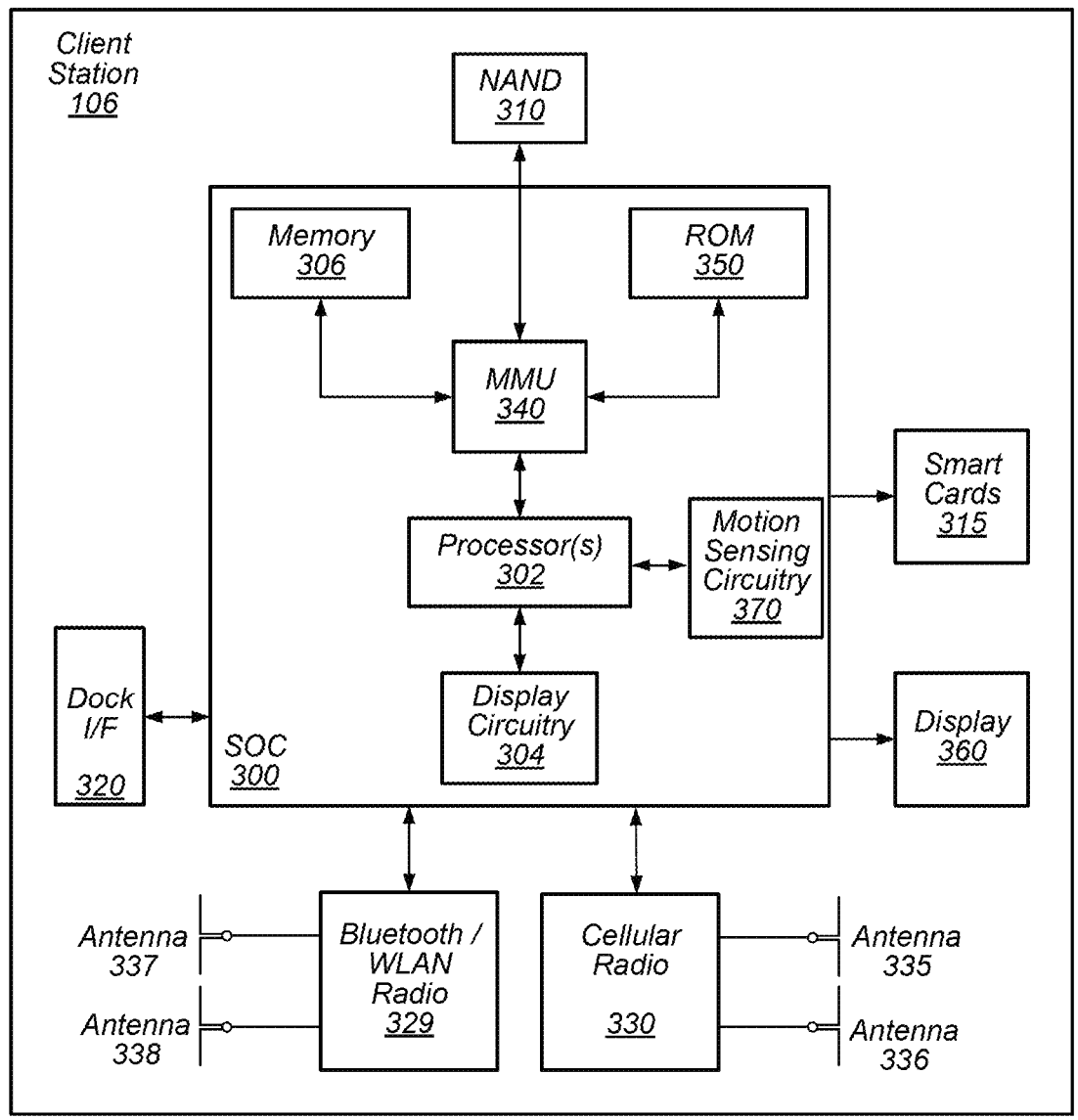
FIG. 3 illustrates an example simplified block diagram of a wireless station (UE), according to some embodiments.

FIG. 3—Client Station Block Diagram

FIG. 3 illustrates an example simplified block diagram of a client station 106, which may be one possible exemplary implementation of the device 100 illustrated in FIG. 1B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (and/or dock) 320 (e.g., for coupling to a computer system, dock, charging station, etc.), the display 360, cellular communication circuitry (e.g., cellular radio) 330 such as for 5G NR, LTE, GSM, etc., and short to medium range wireless communication circuitry (e.g., Bluetooth™/WLAN radio) 329 (e.g., Bluetooth™ and WLAN circuitry). The client station 106 may further include one or more smart cards 315 that incorporate SIM (Subscriber Identity Module) functionality, such as one or more UICC(s) (Universal Integrated Circuit Card(s)). The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1C or for ranging as shown in FIG. 1A. Further, in some embodiments, As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (and/or in addition), processor 302 may be configured as a programmable hardware element, such as an FPGA (Field Programmable Gate Array), or as an ASIC (Application Specific Integrated Circuit). Alternatively (and/or in addition) the processor 302 of the UE 106, in conjunction with one or more of the other components 300, 304, 306, 310, 315, 320,329, 330, 335, 336, 337, 338, 340, 350, 360, 370 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 4:
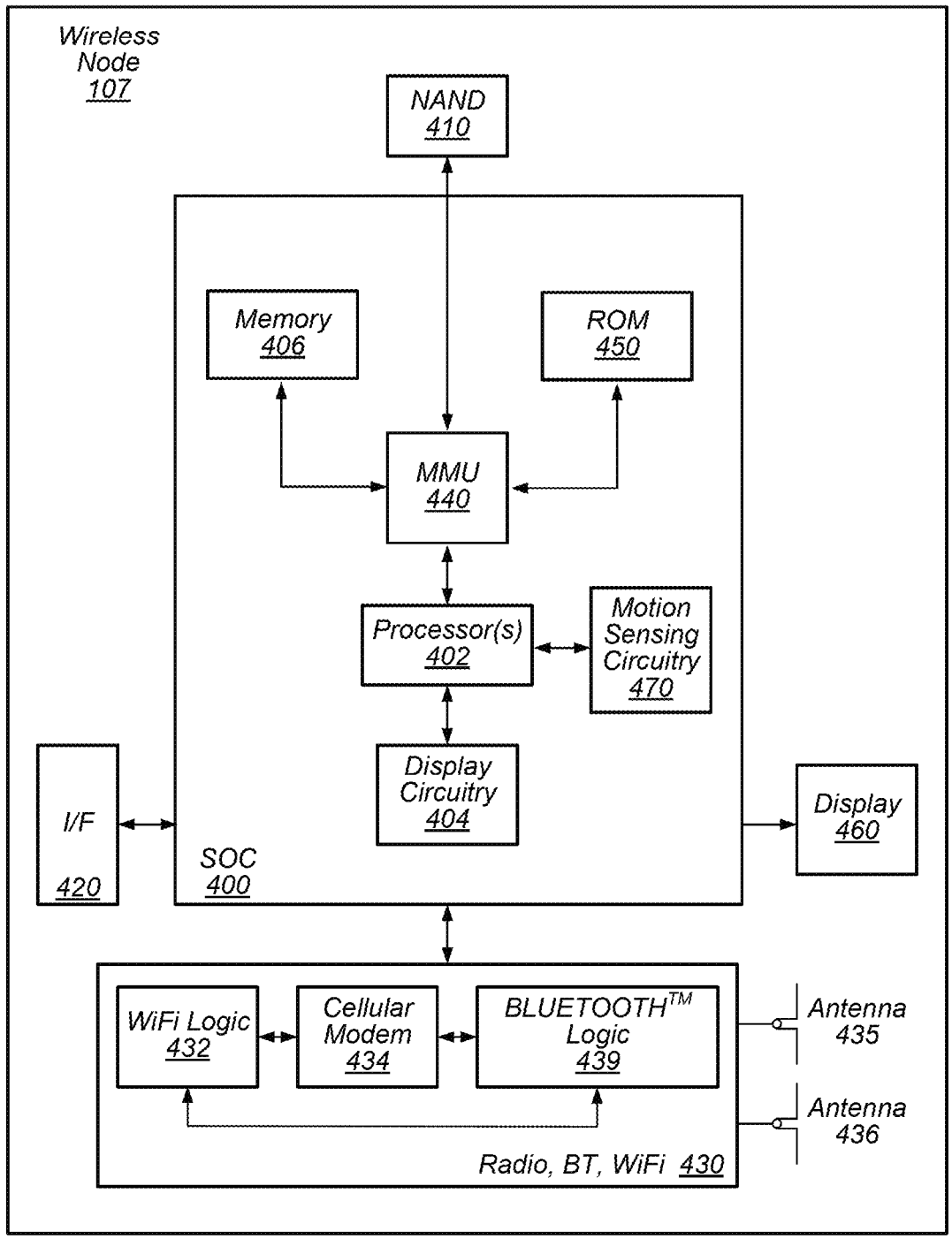
FIG. 4 illustrates an example simplified block diagram of a wireless node, according to some embodiments.

FIG. 4—Wireless Node Block Diagram

FIG. 4 illustrates one possible block diagram of a wireless node 107, which may be one possible exemplary implementation of the device 100 illustrated in FIG. 1B. As shown, the wireless node 107 may include a system on chip (SOC) 400, which may include portions for various purposes. For example, as shown, the SOC 400 may include processor(s) 402 which may execute program instructions for the wireless node 107, and display circuitry 404 which may perform graphics processing and provide display signals to the display 460. The SOC 400 may also include motion sensing circuitry 470 which may detect motion of the wireless node 107, for example using a gyroscope, accelerometer, and/or any of various other motion sensing components. The processor(s) 402 may also be coupled to memory management unit (MMU) 440, which may be configured to receive addresses from the processor(s) 402 and translate those addresses to locations in memory (e.g., memory 406, read only memory (ROM) 450, flash memory 410). The MMU 440 may be configured to perform memory protection and page table translation or set up. In some embodiments, the MMU 440 may be included as a portion of the processor(s) 402.

As shown, the SOC 400 may be coupled to various other circuits of the wireless node 107. For example, the wireless node 107 may include various types of memory (e.g., including NAND flash 410), a connector interface 420 (e.g., for coupling to a computer system, dock, charging station, etc.), the display 460, and wireless communication circuitry 430 (e.g., for 5G NR, LTE, LTE-A, CDMA2000, Bluetooth, Wi-Fi, NFC, GPS, etc.).

The wireless node 107 may include at least one antenna, and in some embodiments, multiple antennas 435 and 436, for performing wireless communication with base stations and/or other devices. For example, the wireless node 107 may use antennas 435 and 436 to perform the wireless communication. As noted above, the wireless node 107 may in some embodiments be configured to communicate wirelessly using a plurality of wireless communication standards or radio access technologies (RATs).

The wireless communication circuitry 430 may include Wi-Fi Logic 432, a Cellular Modem 434, and Bluetooth Logic 439. The Wi-Fi Logic 432 is for enabling the wireless node 107 to perform Wi-Fi communications, e.g., on an 802.11 network. The Bluetooth Logic 439 is for enabling the wireless node 107 to perform Bluetooth communications. The cellular modem 434 may be capable of performing cellular communication according to one or more cellular communication technologies. Some or all components of the wireless communication circuitry 430 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 430 (e.g., Wi-Fi Logic 432) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Mobile Station MLD Privacy and Operation

Issues have developed around privacy of access point (AP) discovery, link setup, and link maintenance. In an effort to improve privacy for scanning stations, IEEE 802.11aq introduced transmission of scanning frames from random Medium Access Control (MAC) addresses. Additionally, privacy of initial public scanning may be improved by an access point's public key. For example, a non-associated wireless station may use the public key and asymmetric cryptography to setup a shared key with the access point. The shared key may be used to encrypt unicast scanning, authentication, and association frames to ensure the privacy of the non-associated station and access point. Further, in IEEE 802.11be, there are proposals to define a Robust Multi-link Device (MLD) Query Request and MLD Query response frames as well as Robust Re-association frames. These frames can be used in an associated state to improve the privacy of the wireless station. The wireless station may perform dummy link setup and then, in associated state, private discovery and link setup with optimized parameters. In addition, IEEE 802.11md introduced Integrity check sum for the beacon frames. Thus, associated stations can verify that the associated access point transmitted the beacon frame.

In current implementations, an access point (AP) Multi Link Device (MLD) node may need to manage and/or optimize its affiliated APs. Thus, an AP MLD node should be able to add more affiliated APs to increase capacity, manage Basic Service Sets (BSSs) interference and coverage, including switching APs to operate in channels with least interference, and/or steer associated non-AP MLD nodes to operate on best performing APs and/or AP MLD nodes. Thus, an AP MLD node may need mechanisms to add affiliated APs to the AP MLD. However, in current implementations, non-AP MLD nodes create all links (e.g., associations between affiliated STAS in non-AP MLD and APs affiliated in AP MLD) upon association with the AP MLD and association request and response signaling are unprotected. This is a privacy threat for the non-AP MLD node and AP MLD as integrity, traceability, and/or privacy of the association signaling may be compromised. Additionally, association resets many parameters such as sequence number (SN), packet number (PN), Block Acknowledgment, traffic specification (TSPEC) parameters, and so forth. These parameters are reset for all frame types and traffic identifiers (IDs), e.g., priority levels. Thus, if/when a non-AP MLD node uses re-association to add an AP link to the associated AP MLD, then the parameters reset interrupts transmissions in all links.

Embodiments described herein provide systems, methods, and mechanisms for robust discovery of an access point (AP) in an AP MLD node, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD. Embodiments described herein may mitigate multi-link maintenance. Note that in embodiments described herein "robust" may refer to wireless communication that can withstand intentional or unintentional disturbances, such as technical faults, signal disturbances, and/or security threats.

For example, a protected broadcast probe response may reduce management frames storms if and/or when an AP in AP MLD changes its parameter values. As another example, a relaxed parameter change counter may indicate that a parameter has changed, but may allow new parameters to be obtained in a link. Further, embodiments described herein may improve privacy of associated non-AP MLD. For example, frame sequence numbers may be made to run in link specific range. As another example, an associated non-AP MLD may change its MLD MAC address, link specific MAC address, sequence numbers, and so forth when it is (re-)associated. As a further example, a wireless station may control whether parameter change is immediate, delayed, or whether there is a sequence of delayed changes. Additionally, embodiments described herein may improve privacy of the AP MLD. For example, an AP MLD may select APs in which it is discoverable and serves legacy wireless stations (e.g., supporting up to IEEE 802.11be). Thus, an AP MLD may serve legacy wireless stations on non-discoverable links and a new beacon frame type may be transmitted on links in which AP is not discoverable. Further, an AP may improve privacy by changing its and associated wireless stations' parameters.

Figure 5A:
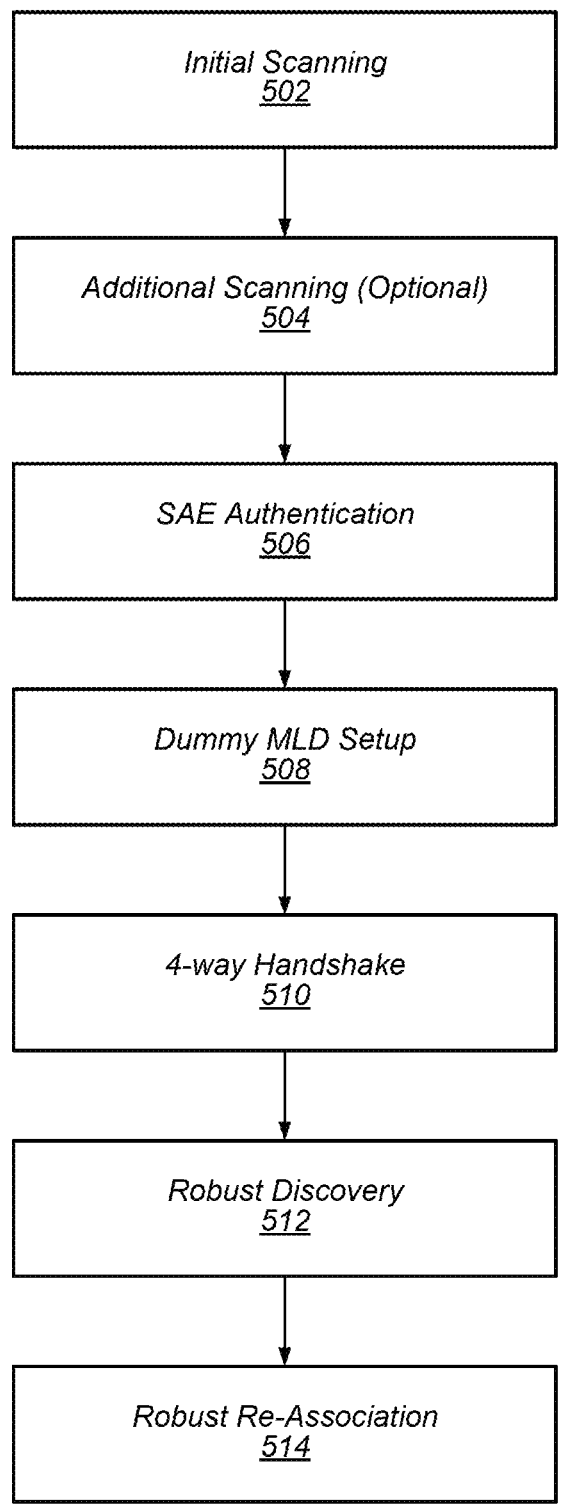
FIG. 5A illustrates a block diagram of an example of a method for secure multilink setup, according to some embodiments.
Figure 5B:
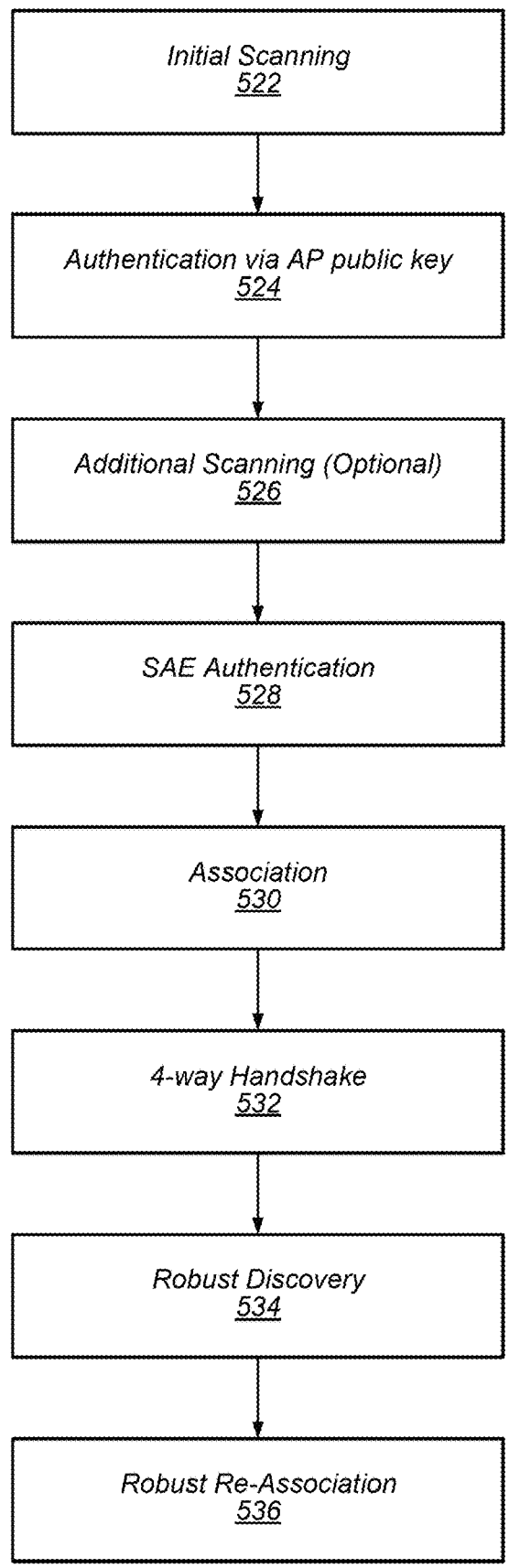
FIG. 5B illustrates a block diagram of another example of a method for secure multilink setup, according to some embodiments.

In some embodiments, a non-AP MLD, e.g., such as wireless station 106, may authenticate and associate to an AP in an AP MLD using default parameters. After association, the non-AP MLD may securely discover other APs, add more links, and/or optimize its link parameters. Such a scheme may aid in protection of privacy of both the non-AP MLD and the AP MLD. For example, FIG. 5A and FIG. 5B illustrate block diagrams of examples of methods for secure multilink setup, according to some embodiments. The methods shown in FIG. 5A and FIG. 5B may be used in conjunction with any of the systems, methods, or devices shown in the Figures, among other devices. In various embodiments, some of the method elements shown may be performed concurrently, in a different order than shown, or may be omitted. Additional method elements may also be performed as desired. Turning to FIG. 5A, as shown, this method may operate as follows.

At 502, a wireless station (STA), such as wireless station 106, may perform initial scanning, e.g., to discover one or more APs in an AP MLD. The initial scanning may include transmitting one or more probe requests and/or receiving one or more probe responses and/or beacons.

At 504, the STA may (optionally) perform additional scanning, e.g., to discover one or more additional links.

At 506, the STA may authenticate with the AP. The authentication may be open, e.g., without a password, or in the authentication AP and STA may verify that they provided and/or proved possession of the password. For instance, STAs may use Simultaneous Authentication of the Equals (SAE) algorithm in authentication.

At 508, the STA may perform "dummy" or placeholder MLD setup with the authenticated AP. In other words, when the discovered AP does not have a public key, the STA may need to send its association signaling/MLD Setup signaling without encryption. Thus, the STA may minimize its private information sharing during MLD setup. The STA may also minimize its information transmission in discovery. For example, the STA may use passive and/or very simple active scanning. Hence, the MLD Setup/association may be simple and the STA may use default parameter values in MLD Setup.

At 510, the STA may perform a 4-way handshake with the discovered AP. The 4-way handshake may then authenticate the discovered AP.

At 512, the STA may perform robust discovery with the associated AP. Thus, the STA may use a robust MLD discovery scheme to discover all APs in the associated AP MLD, including robust discovery MLD probe requests and responses and as well robust MLD query requests and responses. In some embodiments, such communication may be secured using a robust management frame.

At 514, the STA may perform robust re-association or link add signaling within the associated AP MLD, e.g., as necessary and/or as needed. Thus, the STA may use a robust MLD re-association/link setup scheme to setup links with its capabilities and operation parameters optimized for the AP. Alternatively or additionally the STA may also change the parameter values it used in the dummy association. The robust MLD re-association/link setup scheme may include using robust re-association requests and robust re-association responses. In some embodiments, such communication may be secured using a robust management frame.

Turning to FIG. 5B, as shown, this method may operate as follows.

At 522, a wireless station (STA), such as wireless station 106, may perform initial scanning, e.g., to discover one or more APs in an AP MLD. The initial scanning may include transmitting one or more probe requests and/or receiving one or more probe responses and/or beacons.

At 524, the STA may (optionally) setup an encryption key to encrypt frames before the STA has associated with a discovered AP in the AP MLD. In some embodiments, the discovered AP's public key may be received out-of-band, e.g., via a local quick response (QR) code, an authentication server, and so forth. In some embodiments, the discovered AP's public key may be received over an initial wireless link established between the STA and the discovered AP. The STA uses AP's public key to encrypt a message that is used to derive symmetric key between STA and AP. The symmetric key is used to encrypt the messages before the STA has associated with the AP. If the AP's public key is available, the STA may encrypt the authentication and association signaling.

At 526, the STA may (optionally) perform additional scanning, e.g., to discover one or more additional links.

At 528, the STA may perform authentication with the AP to initiate association process. For instance, the authentication may use SAE authentication protocol. The authentication messages may be protected by the symmetric key derived with the AP at 524.

At 530, the STA may associate with the AP. In the association, the STA may establish all links that it desires to use. The association request and response may be protected by the symmetric key derived with the AP at 524.

At 532, the STA may perform a 4-way handshake with the AP. The 4-way handshake may then authenticate the associated AP. The 4-way handshake messages may be protected by the symmetric key derived with the AP at 524.

At 534, the STA may perform robust discovery with the associated AP. Thus, the STA may use a robust MLD discovery scheme to discover all APs in the associated AP MLD, including robust discovery MLD probe requests and responses and as well robust MLD query requests and responses. In some embodiments, such communication may be secured using a robust management frame. Note that after the STA has established keys via the 4-way handshake, the STA may discontinue use of the symmetric key derived with the AP at 524.

At 536, the STA may perform robust re-association or link add signaling within the associated AP MLD, e.g., as necessary and/or as needed. Thus, the STA may use a robust MLD re-association/link setup scheme to setup links with its capabilities and operation parameters optimized for the AP. Alternatively or additionally the STA may also change the parameter values it used in the dummy association. The robust MLD re-association/link setup scheme may include using robust re-association requests and robust re-association responses. In some embodiments, such communication may be secured using a robust management frame.

Figure 6A:
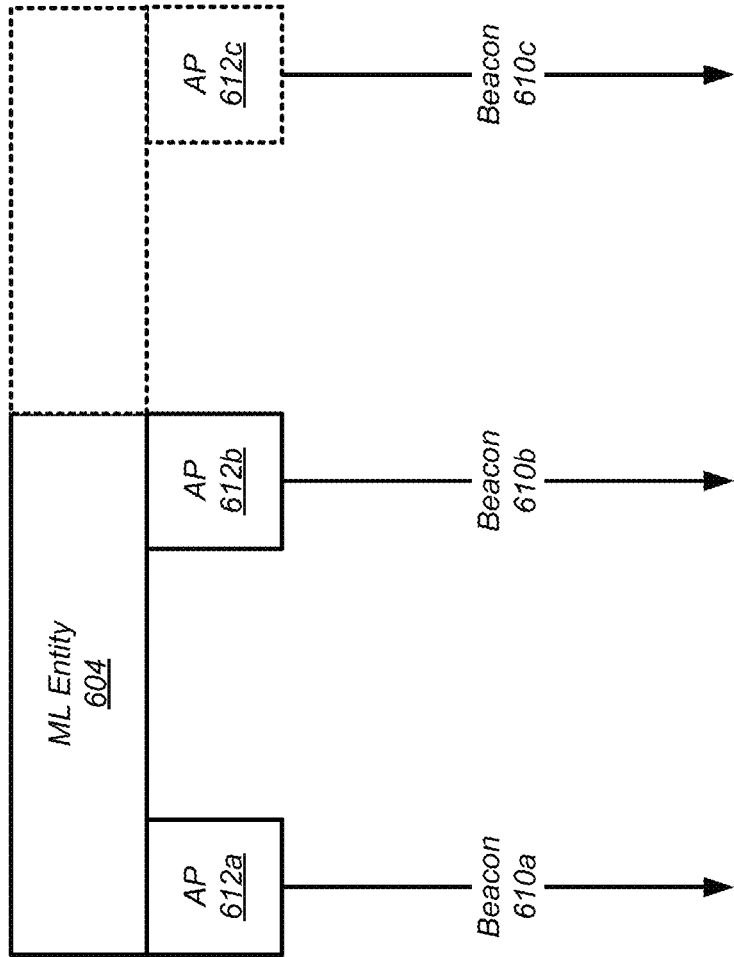
FIG. 6A illustrates an example of a multilink entity adding a new AP, according to some embodiments.

In some embodiments, e.g., as illustrated by FIG. 6A, when an AP MLD adds a new affiliated AP, the new AP may be included in a transmitted Reduced Neighbor Report (RNR) element and multilink element. In some embodiments, a beacon may contain a set of new AP parameters. Additionally, associated STAs may detect the new AP by receiving beacons from other APs in the AP MLD. Further, legacy STAs may find the new AP through passive and/or active scanning. In some embodiments, an AP MLD may mitigate link add storms by delaying new AP parameters transmission in beacons. Thus, as shown in FIG. 6A, a multilink (ML) entity 604 may include APs 612a and 612b. APs 612a and 612b may transmit beacons 610a and 610b, respectively. The beacons 610a and 610b may include respective RNR information and ML element information. Then, when the ML entity 604 adds AP 612c (e.g., a new AP), the AP 612c may also transmit a beacon 610c that may include RNR information and ML element information for AP 612c.

Figure 6B:
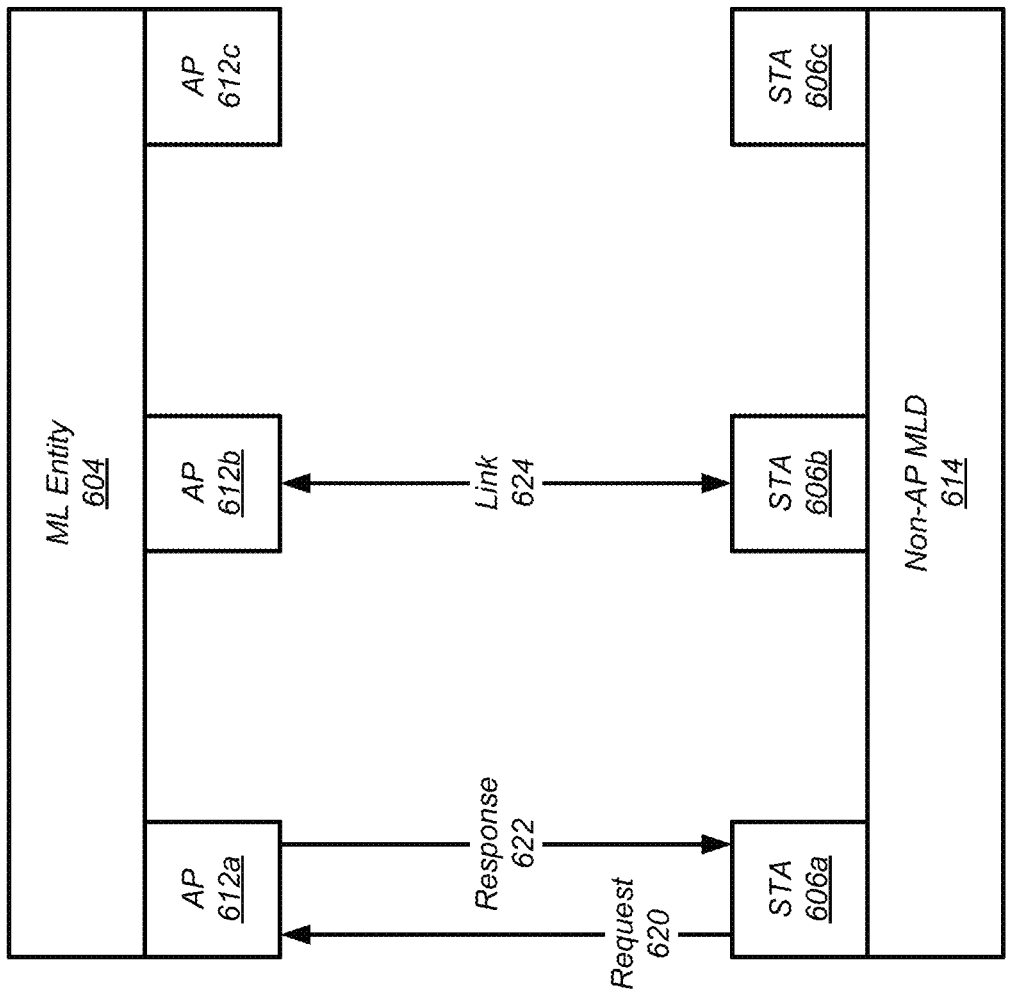
FIG. 6B illustrates an example of secure multilink scanning, according to some embodiments.

In some embodiments, e.g., as illustrated by FIG. 6B, an associated non-AP MLD (e.g., such as wireless station 106 and or wireless node 107) may send a robust ML query request to query available APs and associated parameters in the AP MLD. In other words, the associated non-AP MLD may perform secure multilink scanning. As shown, non-AP MLD 614 may be associated with ML entity 604 and may include STAs 606a-c. STA 606a may send a robust ML query request 620 to AP 612a. AP 612a may respond with a response 622. The response 622 may be a unicast ML query response to STA 606a or may be a broadcast (ML) probe response that responds to request 620 as well as one or more additional requests (e.g., from other STAs). Additionally, as shown, STA 606b may have an established link 624 with AP 612b.

In some embodiments, the response 622 may be considered an integrity protected broadcast probe response. The integrity protected broadcast probe response may include a medium access control (MAC) Management Encapsulation element (MME). The MME may be the last element in a frame. As illustrated by FIG. 7A, an integrity protected broadcast probe response may include a header, a timestamp, an interval element, and various information elements, including the MME. Additionally, as shown in FIGS. 7B and 7C, the MME may include an element identifier (ID) field, a length field, a key ID field, a Beacon Integrity Packet Number (BIPN) field and/or a probe response integrity packet number (PRPN), and a message integrity check (MIC) field. In some embodiments, an integrity check sum may be calculated over the entire probe response and the timestamp field may be masked (e.g., set to 0) prior to the integrity check sum calculation. In some embodiments, the probe response may use the same Beacon Integrity Group Temporal Key (BIGTK) as used for beacon integrity verification. Additionally, the probe response may use the same BIPN, e.g., as illustrated by FIG. 7B, as beacons or have a separate PRPN, e.g., as illustrated by FIG. 7C. Further, STAs that have BIGTK security association (BIGTKSA) may verify the integrity of the broadcast probe response.

Figure 6C:
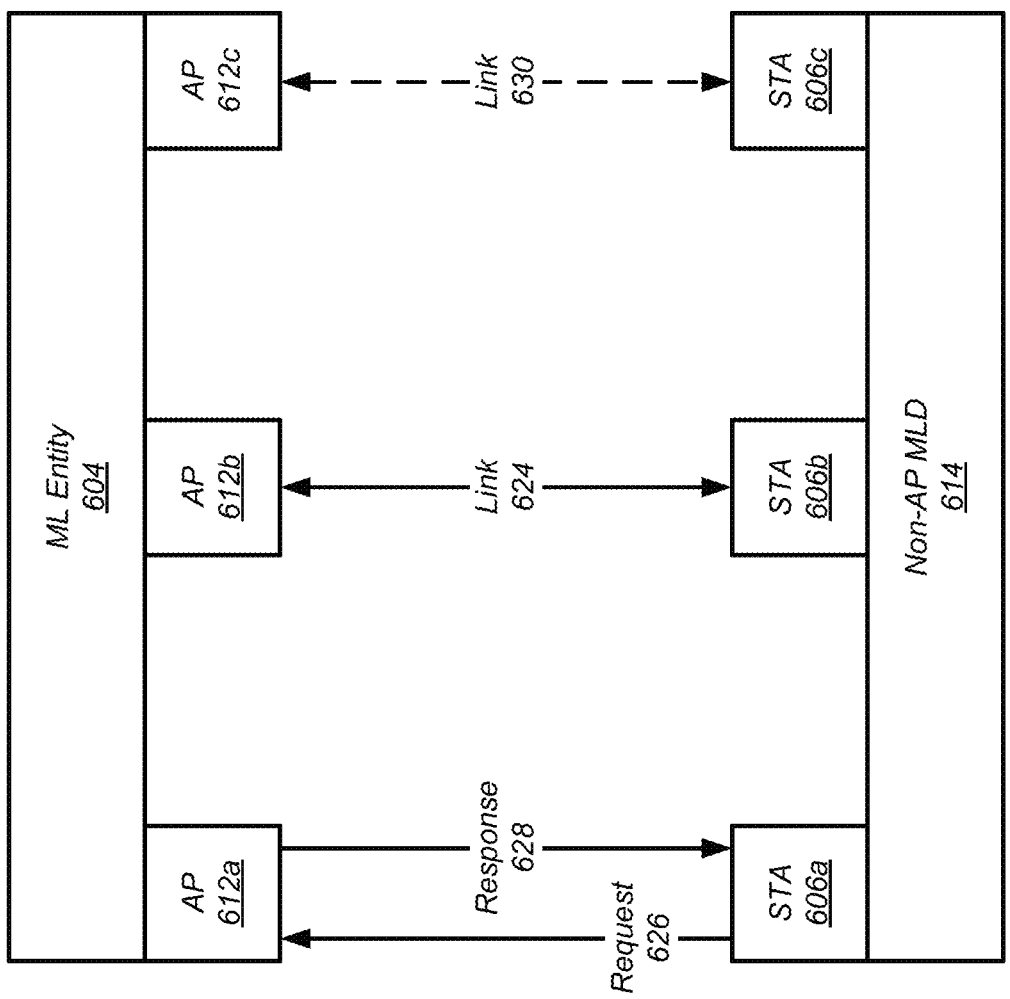
FIG. 6C illustrates an example of secure multilink addition, according to some embodiments.

In some embodiments, e.g., as illustrated by FIG. 6C, an associated non-AP MLD (e.g., such as wireless station 106 and or wireless node 107) may add a new link (e.g., link 628) without interrupting operation of other links via a robust add link request (e.g., request 624) and a robust add link response (e.g., response 626). In some embodiments, sequence number (SN), packet number (PN), caches, block acknowledgments, TSPECs, and so forth between non-AP MLD 614 and ML entity 604 may not be reset. In some embodiments, a Group Temporal Key (GTK) may be provided for the new link. Additionally, once the new link is added, non-AP STA and MLD parameters may be tuned to with AP MLD. Note that the robust add link request and response may be secure and private, e.g., by using an integrity protected broadcast probe response as described in reference to FIGS. 7A-7C.

Figure 8A:
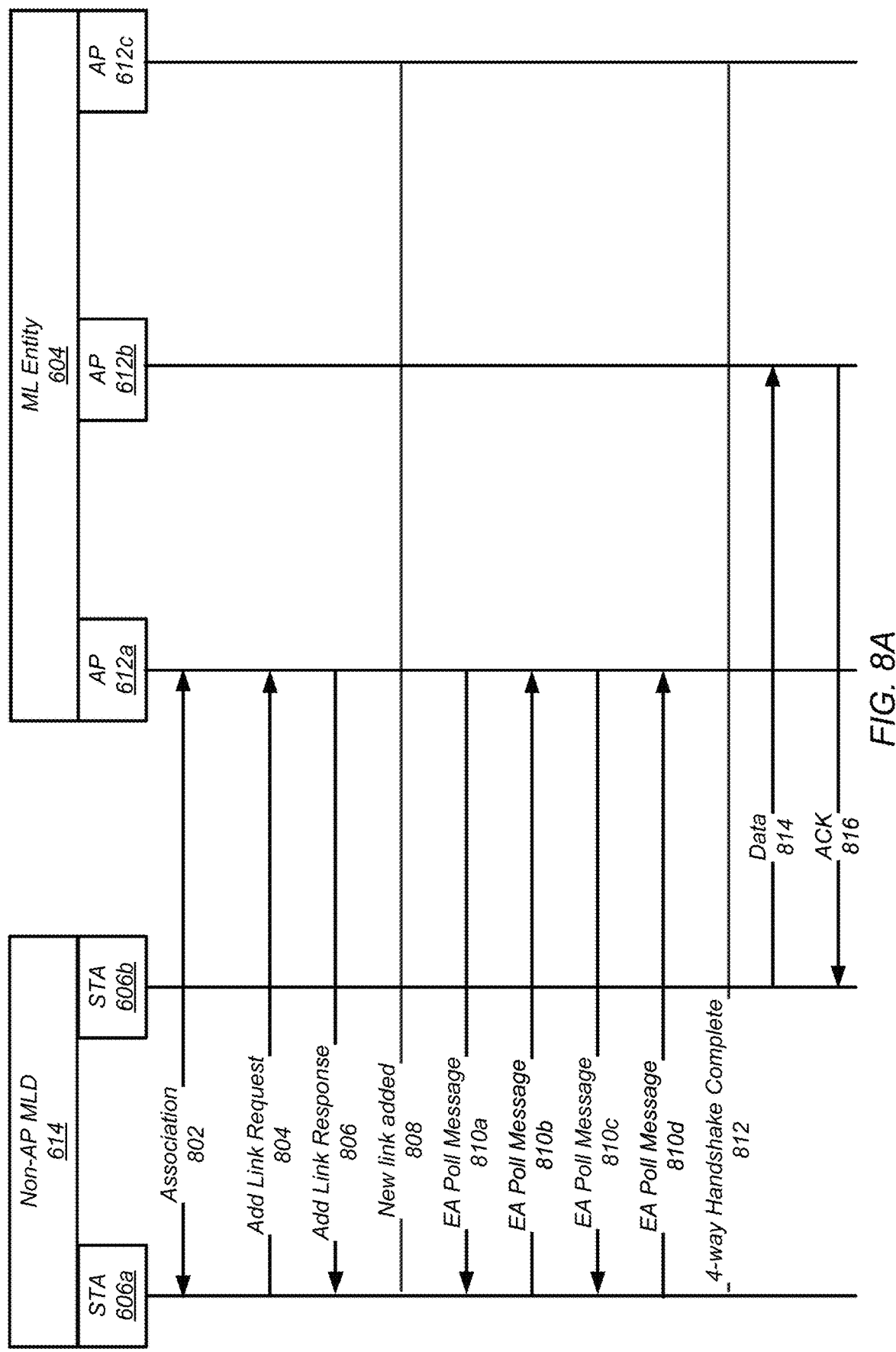
FIG. 8A-8C illustrate examples of signaling for providing a GTK for a new link, according to some embodiments.

FIG. 8A illustrates an example of signaling for providing a GTK for a new link, according to some embodiments. The signaling shown in FIG. 8A may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

Signaling 802 may associate STA 606a with AP 612a, e.g., as described herein. Then, STA 606a may send an add link request 804 to AP 612a. The add link request 804 may indicate that a link for STA 606b is to be added. The add link request 804 may be a robust add link request, e.g., as described herein. In some embodiments, for each added link, a complete set of non-AP STA parameters and AP parameters may be provided. Note that if a non-default TID-to-link mapping is used, the robust re-association may include TID-To-Link mapping, otherwise default mapping (transmission of all TIDs on all links may be used). Additionally, a power mode (PM) for the link may be provided by the non-AP STA (e.g., STA 606a) for the link. Further, the non-AP MLD (e.g., non-AP MLD 614) may provide multilink attributes that may specify its non-STR/STR capability (e.g., whether the non-AP MLD is capable of simultaneous transmission/reception on multiple links for a given set of links) with the new added link and the existing links. AP 612a may respond with an add link response 806. The add link response 806 may indicate that the link for STA 606b may be supported by AP 612b. In other words, the new link will be added between STA 606b and AP 612b. The add link response 806 may be a robust add link response, e.g., as described herein. After the new link is added at 808, STA 606a and AP 612a may exchange EA poll messages 810a-d as part of a 4-way handshake to establish BIGTK secure architecture (BIGTKSA), an integrity GTK (IGTK) secure architecture (IGTKSA) and GTK secure architecture (GTKSA) for the new link. Note that all links use the same peer wise transient key secure architecture (PTKSA) that may already be setup via initial association for the unicast frames. Upon completion of the 4-way handshake at 812, STA 606a may transmit data 814 to AP 612b. AP 612b may transmit an acknowledgment 816 of the data, as shown.

Figure 8B:
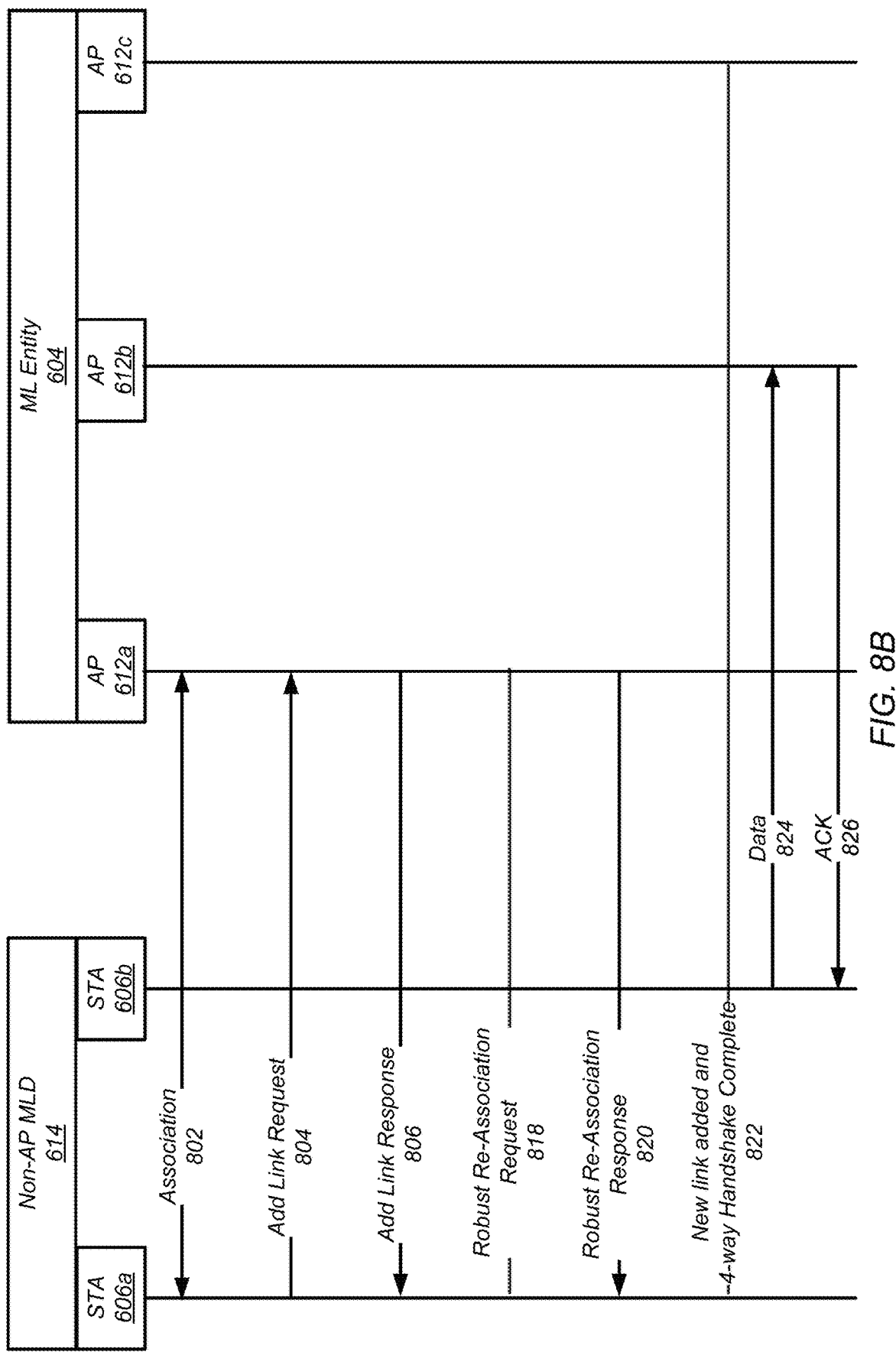

FIG. 8B illustrates another example of signaling for providing a GTK for a new link, according to some embodiments. The signaling shown in FIG. 8B may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As noted, signaling 802 may associate STA 606a with AP 612a, e.g., as described herein. Then, STA 606a may send an add link request 804 to AP 612a. The add link request 804 may indicate that a link for STA 606b is to be added. The add link request 804 may be a robust add link request, e.g., as described herein. In some embodiments, for each added link, a complete set of non-AP STA parameters and AP parameters may be provided. Note that if a non-default TID-to-link mapping is used, the robust re-association may include TID-To-Link mapping, otherwise default mapping (transmission of all TIDs on all links may be used). Additionally, a power mode (PM) for the link may be provided by the non-AP STA (e.g., STA 606a) for the link. Further, the non-AP MLD (e.g., non-AP MLD 614) may provide multilink attributes that may specify its non-STR/STR capability (e.g., whether the non-AP MLD is capable of simultaneous transmission/reception on multiple links for a given set of links) with the new added link and the existing links. AP 612a may respond with an add link response 806. The add link response 806 may indicate that the link for STA 606b may be supported by AP 612b. In other words, the new link will be added between STA 606b and AP 612b. The add link response 806 may be a robust add link response, e.g., as described herein. In some embodiments, STA 606a may use fast MLD transition signaling to reduce a number of transmitted frames in robust re-association. Thus, as shown, after receiving the add link response 806, STA 606a may transmit a robust re-association request 818 indicating addition of a link for STA 606b. The robust re-association request may use robust re-association frames. AP 612a may respond with a robust re-association response 820 indicating the addition of the link will be supported by AP 612b. The re-association response may use robust re-association frames. Note that the robust re-association (e.g., fast MLD transition signaling) may establish BIGTKSA, IGTKSA and GTKSA for the new link. Upon completion of the addition of the new link and 4-way handshake (accomplished via the fast MLD transition signaling) at 822, STA 606a may transmit data 824 to AP 612b. AP 612b may transmit an acknowledgment 826 of the data, as shown.

Figure 8C:
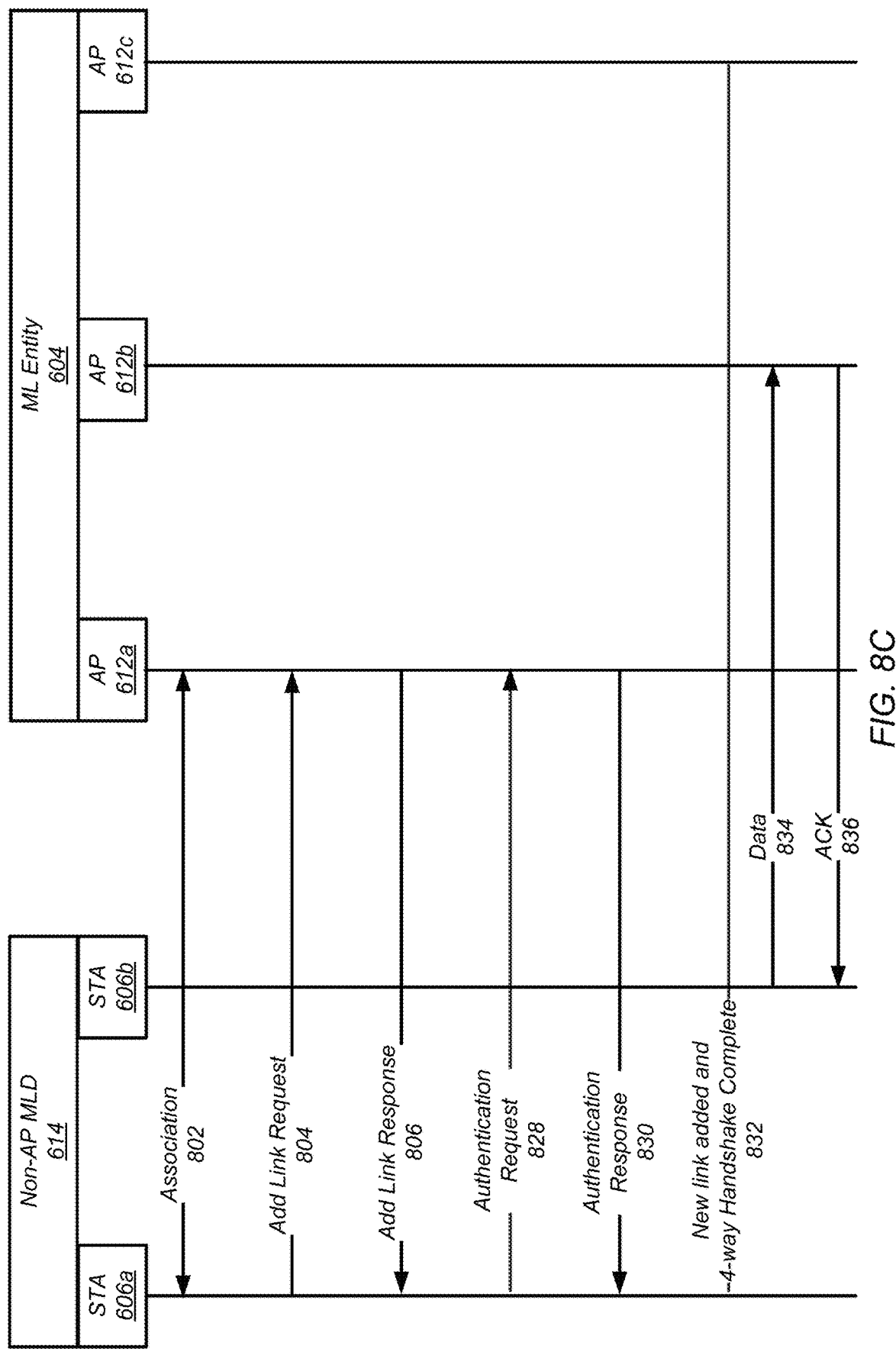

FIG. 8C illustrates a further example of signaling for providing a GTK for a new link, according to some embodiments. The signaling shown in FIG. 8C may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As noted, signaling 802 may associate STA 606a with AP 612a, e.g., as described herein. Then, STA 606a may send an add link request 804 to AP 612a. The add link request 804 may indicate that a link for STA 606b is to be added. The add link request 804 may be a robust add link request, e.g., as described herein. In some embodiments, for each added link, a complete set of non-AP STA parameters and AP parameters may be provided. Note that if a non-default TID-to-link mapping is used, the robust re-association may include TID-To-Link mapping, otherwise default mapping (transmission of all TIDs on all links may be used). Additionally, a power mode (PM) for the link may be provided by the non-AP STA (e.g., STA 606a) for the link. Further, the non-AP MLD (e.g., non-AP MLD 614) may provide multilink attributes that may specify its non-STR/STR capability (e.g., whether the non-AP MLD is capable of simultaneous transmission/reception on multiple links for a given set of links) with the new added link and the existing links. AP 612a may respond with an add link response 806. The add link response 806 may indicate that the link for STA 606b may be supported by AP 612b. In other words, the new link will be added between STA 606b and AP 612b. The add link response 806 may be a robust add link response, e.g., as described herein. In some embodiments, STA 606a may use modified fast MLD transition signaling to reduce a number of transmitted frames in robust re-association. Thus, as shown, after receiving the add link response 806, STA 606a may transmit an authentication request 828 to AP 612A. AP 612a may respond with an authentication response 830. Note that the authentication (e.g., modified fast MLD transition signaling) may establish BIGTKSA, IGTKSA, and GTKSA for the new link. Upon completion of the addition of the new link and 4-way handshake (accomplished via the modified fast MLD transition signaling) at 832, STA 606a may transmit data 834 to AP 612b. AP 612b may transmit an acknowledgment 836 of the data, as shown.

In some embodiments, a STA, such as STA 106 and/or STAs 606a-c, may hide its MLD MAC address and use link specific addresses. The non-AP MLD may define, during association, link specific MAC addresses and/or a temporary non-AP MLD address. The temporary non-AP MLD address may be used for group addressed frames and A-MSDU transmission. Actual (e.g., real) non-AP MLD address may only be used for authentication. In some embodiments, e.g., as illustrated by FIG. 9, an add link request may be used to randomize STA MAC addresses.

Figure 9:
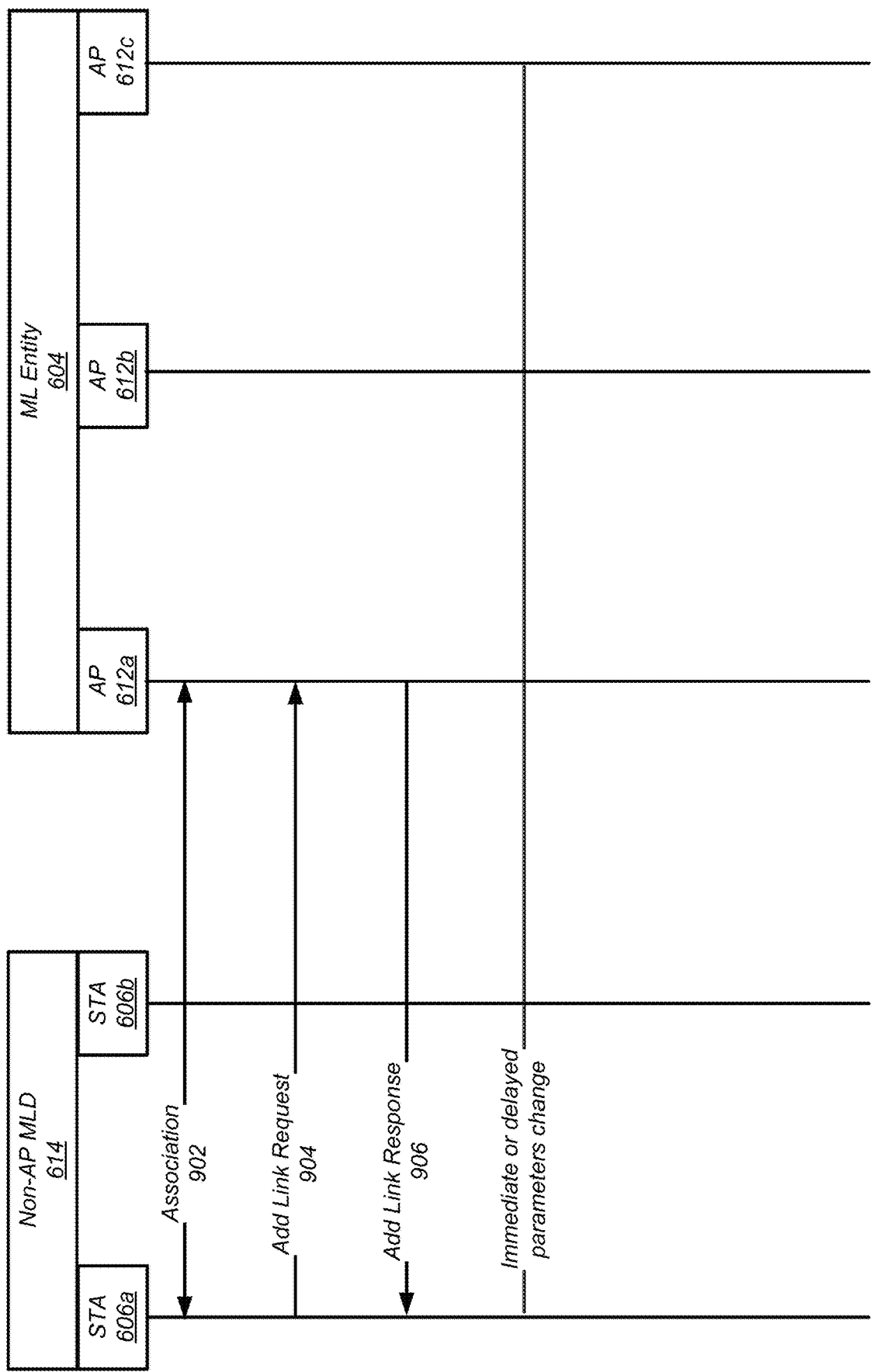
FIG. 9 illustrates an example of signaling for randomizing a wireless station's MAC address, according to some embodiments.

FIG. 9 illustrates an example of signaling for randomizing a wireless station's MAC address, according to some embodiments. The signaling shown in FIG. 9 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

Signaling 902 may associate STA 606a with AP 612a, e.g., as described herein. Then, STA 606a may send an add link request 904 to AP 612a. The add link request 904 may indicate a MAC address associated with a link, a new MLD MAC address sequence number (SN) offset, including TID, UL, DL, and a TSF of the update to the MAC address. The add link request 904 may be a robust add link request, e.g., as described herein. AP 612a may send an add link response 906 to STA 606a. The add link response 906 may indicate the MAC address associated with the link, the new MLD MAC address sequence number (SN) offset, including TID, UL, DL, and the TSF of the update to the MAC address. Upon reception of the add link response 906, the new MAC address may be implemented (e.g., an immediate parameter change) or a delay may occur prior to the new MAC address being implemented (e.g., a delayed parameter change). Note that multiple future changes to the MAC address may also be scheduled. For example, each STA in a non-AP MLD and AP in an AP MLD may change its parameters at a different schedule and/or on the same schedule. Note that there may be multiple sequence number spaces used (e.g., for unicast management frames, there may be Traffic ID (TID)/priority level specific unicast data sequence number offsets). For each of the sequence number spaces, a sequence number offset may be defined separately. In some embodiments, it may be recommended to change sequence number offsets for all TIDs and frame types when a STA and/or AP specific address changes.

Figure 10:
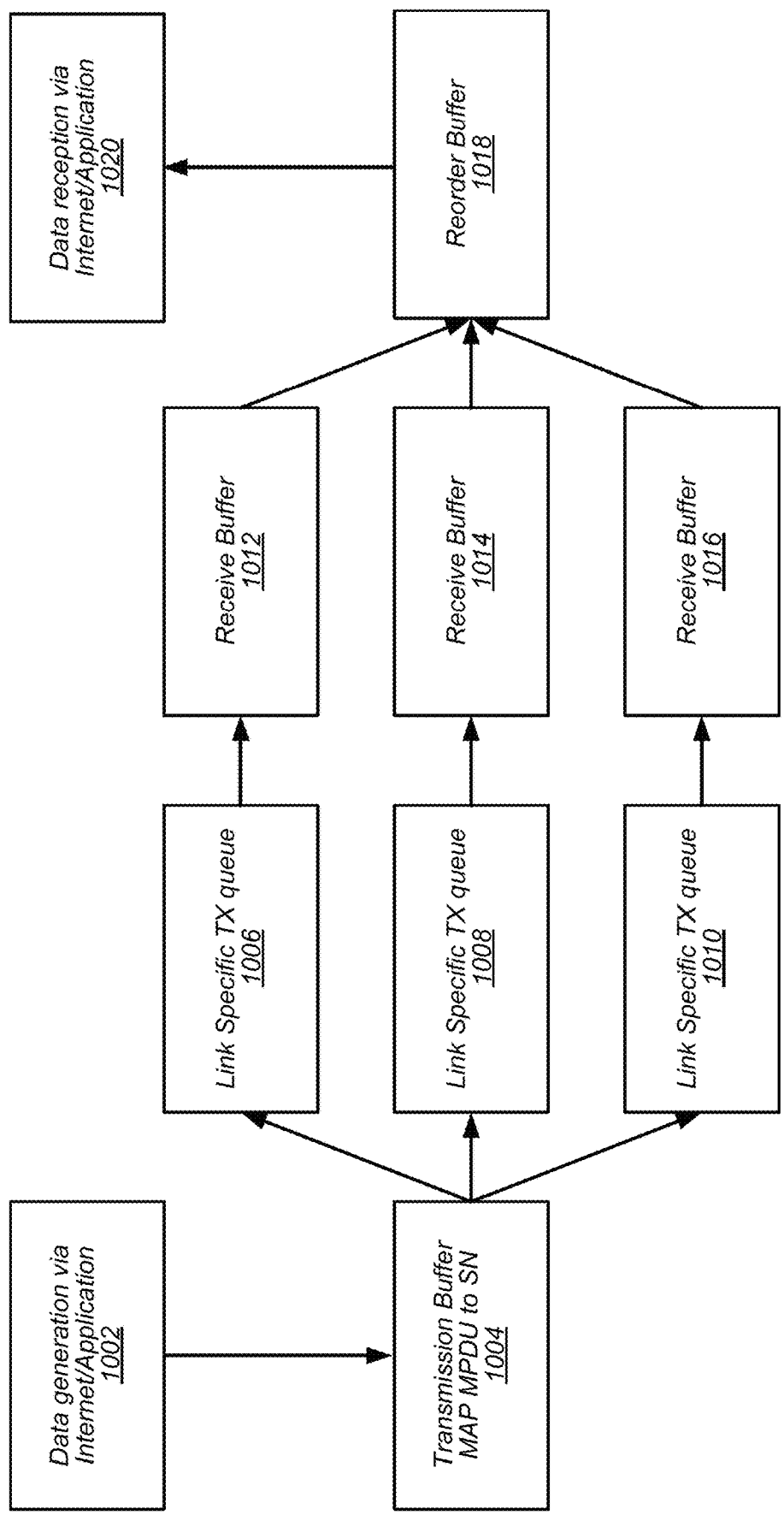
FIG. 10 illustrates a block diagram of an example of a method for randomizing SN offsets, according to some embodiments.

In some embodiments, the SN offset (e.g., included in the add link request 904/add link response 906) may be randomized, e.g., to make it more difficult for third parties to detect wireless stations that belong to a non-AP MLD. In some embodiments, SN offsets may be link specific. FIG. 10 illustrates a block diagram of an example of a method for randomizing SN offsets, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, an application and/or website (e.g., Internet) may generate data (e.g., one or more MAC PDUs) that may be received into a transmission buffer at 1004. The transmission buffer may map the MAC PDUs (MPDUs) to sequence numbers (SNs). The transmission buffer may forward the MAC PDUs, e.g., based on sequence number, to one or more transmit queues, each transmit queue associated with a link between a non-AP MLD and an ML entity. At 1006, a first transmit queue associated with a first link may receive an MPDU with an associated SN. The first transmit queue may add a link offset (e.g., Offset_link 1) to the SN to generate a link specific SN, e.g., SN_link1. Similarly, at 1008, a second transmit queue associated with a second link may receive an MPDU with an associated SN. The second transmit queue may add a link offset (e.g., Offset_link 2) to the SN to generate a link specific SN, e.g., SN_link2. Further, at 1010, a third transmit queue associated with a third link may receive an MPDU with an associated SN. The third transmit queue may add a link offset (e.g., Offset_link 3) to the SN to generate a link specific SN, e.g., SN_link3. At 1010, a first receive buffer may receive an MPDU with a sequence number of SN_link1 from the first transmit queue via the first link. The first receive buffer may determine the sequence number associated with MPDU by removing the SN offset associated with the first link, e.g., Offset_link1. Similarly, at 1012, a second receive buffer may receive an MPDU with a sequence number of SN_link2 from the second transmit queue via the second link. The second receive buffer may determine the sequence number associated with MPDU by removing the SN offset associated with the second link, e.g., Offset_link2. Further, at 1014, a third receive buffer may receive an MPDU with a sequence number of SN_link3 from the third transmit queue via the third link. The third receive buffer may determine the sequence number associated with MPDU by removing the SN offset associated with the third link, e.g., Offset_link3. At 1016, a reorder buffer may reorder the MPDUs received via the first, second, and third receive buffers based on the determine sequence numbers of each MPDU. At 1016, a server of the website and/or application may receive the data.

Figure 11:
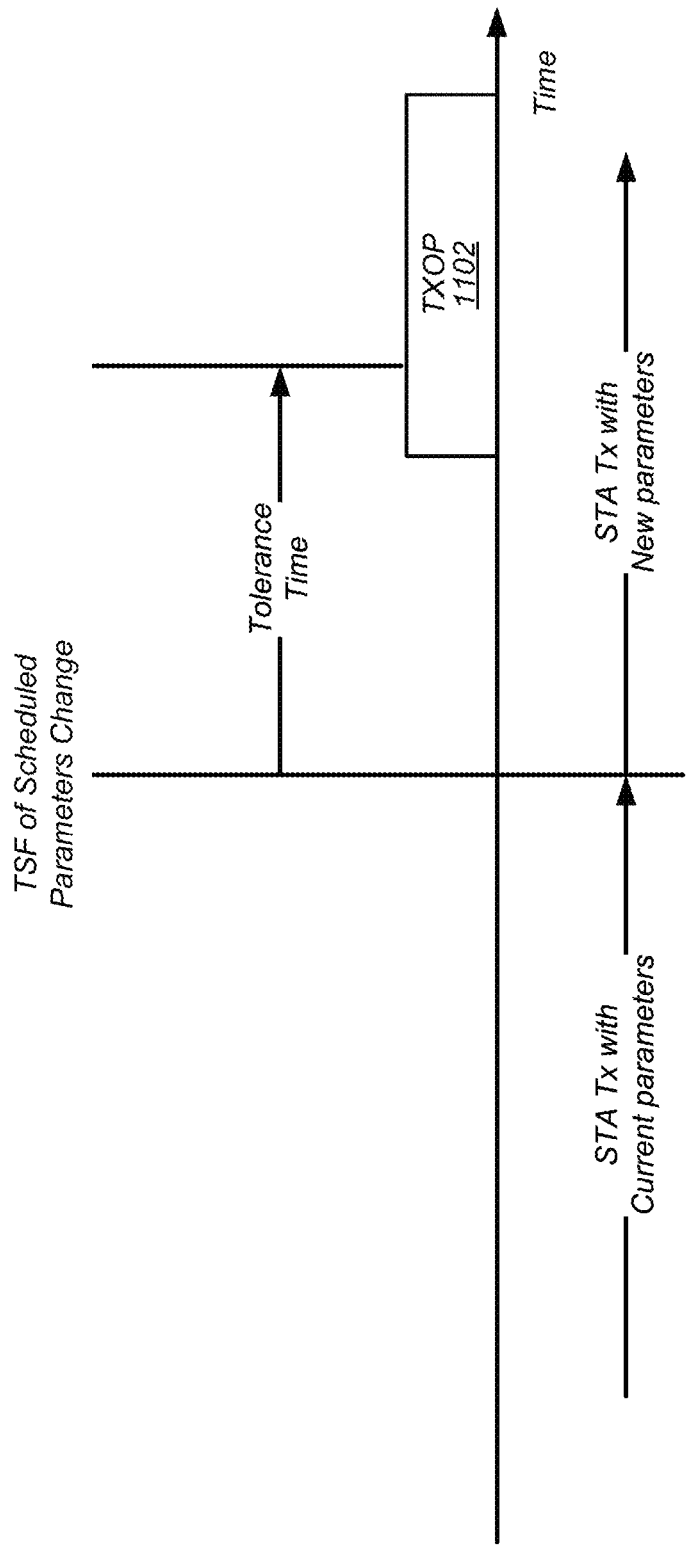
FIG. 11 illustrates an example of a scheduled parameters change, according to some embodiments.

In some embodiments, MPDUs transmitted after a scheduled MAC address and/or sequence number change time may use new parameters (e.g., associated with updated MAC address and/or sequence number). In some embodiments, MPDUs transmitted after TSF time, e.g., as illustrated by FIG. 11, may use the new parameters. Note that MPDUs transmitted prior to the TSF time may use current (e.g., old) parameters. In some embodiments, retransmissions and MPDUs that are buffered in a link specific transmission queue (e.g., as of the TSF time) may use current (e.g., old) values. Note that MPDUs transmitted in a physical PDU (PPDU) may use only new or old parameter values. As further illustrated by FIG. 11, in some embodiments, a scheduled MAC address and/or sequence number (e.g., parameters) change time may include a tolerance time. As shown, when a transmission opportunity, such as TXOP 1102, is initiated during the tolerance time, a receiver may detect from an AID and MAC Addresses whether the transmitted PPDU has the new or current parameter values, e.g., as further described with reference to FIG. 12. Thus, PPDUs/MPDUs transmitted during the tolerance time may use either current or new parameter values. However, TXOPs initiated after the tolerance time will be received only if PPDUs/MPDUs are transmitted with the new parameter values.

Figure 12:
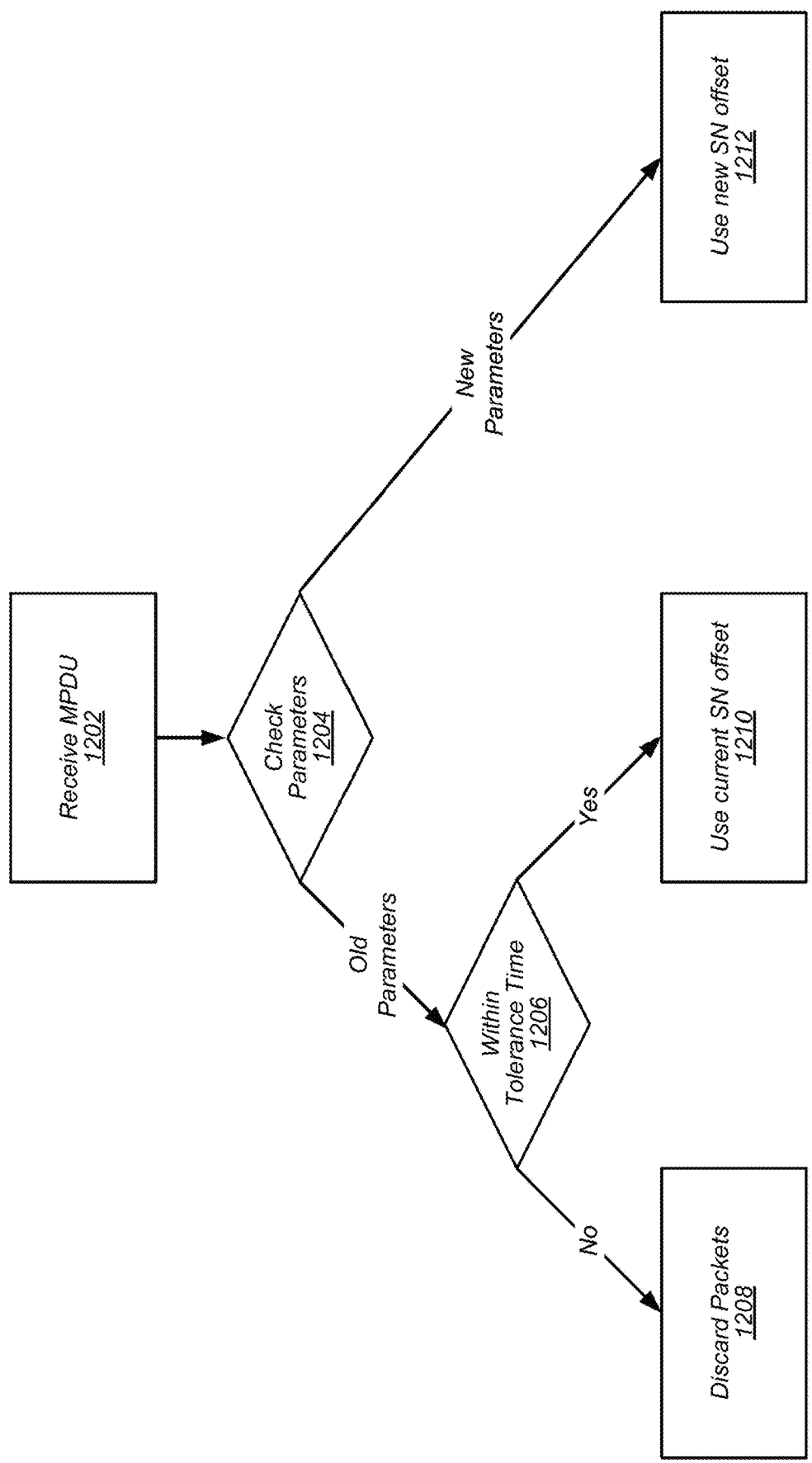
FIG. 12 illustrates a block diagram of an example of a method for selecting an SN offset during a parameters change, according to some embodiments.

FIG. 12 illustrates a block diagram of an example of a method for selecting an SN offset during a parameters change, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a receiver, e.g., such as an AP of a ML entity, may receive a MAC PDU (MPDU) over a link with a non-AP MLD, e.g., from a wireless station of a non-AP MLD. At 1204, the receiver may determine whether parameters associated with the MPDU are parameters used prior to a parameters change time (e.g., old parameters) or parameters used after the parameters change time (e.g., new parameters). At 1206, in response to determining that the parameters associated with the MPDU are old parameters, the receiver may determine whether the MPDU was transmitted during a tolerance time. At 1208, in response to determining that the MPDU was transmitted after the tolerance time, the receiver may discard the MPDU. Alternatively, at 1210, in response to determining that the MPDU was transmitted before and/or during the tolerance time, the receiver may acknowledge the MPDU and determined a sequence number of the MPDU using an SN offset used prior to the parameters change time (e.g., an old SN offset). The receiver may then add the MPDU to a reorder buffer using the determine sequence number. Further, at 1212, in response to determining that the parameters associated with the MPDU are new parameters, the receiver may acknowledge the MPDU and determine a sequence number of the MPDU using an SN offset used after the parameters change time (e.g., a new SN offset). The receiver may then add the MPDU to a reorder buffer using the determined sequence number.

Figure 13:
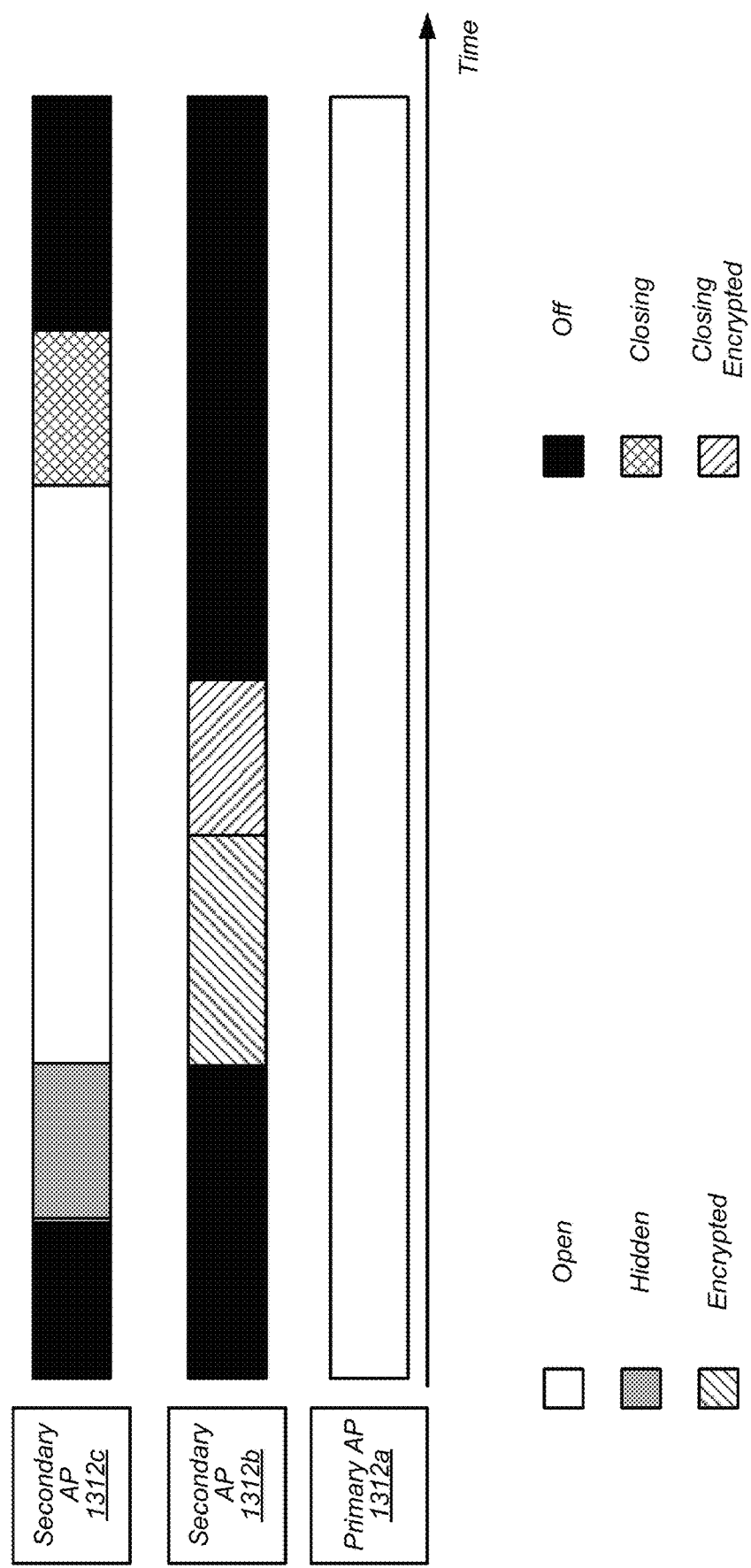
FIG. 13 illustrates examples of various operational phases of APs of an ML entity during an AP addition, according to some embodiments.

In some embodiments, APs of an ML entity may operate in various phases during an AP addition to the ML entity. For example, FIG. 13 illustrates examples of various operational phases of APs of an ML entity during an AP addition, according to some embodiments. As shown, an AP may be in any of six operational phases during an AP addition. In an open phase (e.g., a default operational mode), an AP may remain in an active mode and may be visible to all wireless stations within range. In a hidden phase, an AP may not be included to a reduced neighbor report (RNR) and ML element of other APs in an AP MLD. Note that while in the hidden phase, the AP may only be discoverable on its primary channel. In an encrypted phase, an AP may transmit encrypted beacons and may be visible only to selected wireless stations that know the AP beacon encryption key. In an off phase, the AP may be non-operational. In a closing and/or closing encrypted phase, an AP may be closing (e.g., transitioning to the off phase) and may be in the process of safely terminating links to all wireless stations. As shown in FIG. 13, a primary AP 1312a may remain in an open phase of operation during addition of one or more APs (e.g., secondary APs 1312b and 1312c). Secondary AP 1312b, upon addition, may transition from an off phase to an encrypted phase and may only be discoverable to selected wireless stations (e.g., as selected by primary AP 1312a). After a time period, the secondary AP 1312b may decide to transition to an off phase and may include a closing encrypted phase prior to the off phase, e.g., to safely terminate links to wireless stations associated with AP 1312b. Secondary AP 1312c, upon addition, may transition from an off phase to a hidden phase prior to transitioning to an open phase. The hidden phase may aid in the AP 1312c avoiding link signaling storms upon entering the open phase. After a time period in the open phase, the AP 1312c may decide to transition to an off phase and may include a closing phase prior to the off phase, e.g., to safely terminate links to wireless stations associated with AP 1312c.

In some embodiments, APs of an ML entity (e.g., APs of an AP MLD) may operate in various beaconing modes. In such embodiments, an AP broadcasting in a hidden beaconing mode, private beaconing mode, encrypted beaconing mode, and/or not transmitting beacons may not be included to RNR and ML elements in beacons, probe responses, and/or multi-link probe response of other APs in the AP MLD. Thus, such an AP cannot be discovered by beacons received from another AP in the AP MLD. Note that an AP transmitting in a hidden beaconing mode may transmit normal beacon frames that may include other APs in the AP MLD to its RNR and ML element. Note further that an AP transmitting in a private beaconing mode may transmit normal beacon frames that do not include other APs in the AP MLD to its RNR and ML element. Additionally, an AP transmitting in an encrypted beacon mode may not use a normal beacon frame. Instead, receivers may be required to detect content of the beacon frame. e.g., the beacon frame may be encrypted by a GTK used for management frames. Such a beacon frame may shorter than a normal beacon frame. Additionally, such a beacon frame may not include S SID, security parameters, and/or BSS performance parameters. Such a beacon frame may include other APs in the AP MLD to its RNR and ML element.

Figure 14D:
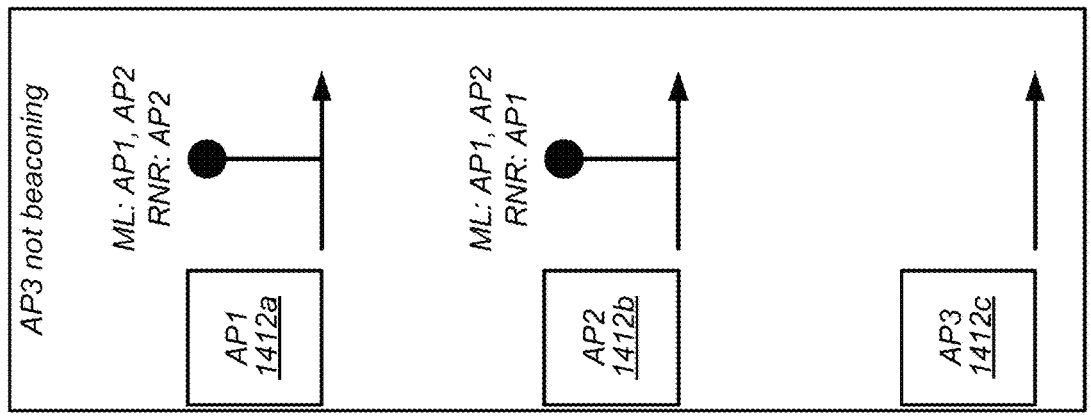
FIGS. 14A-14D illustrate examples of various AP beaconing modes, according to some embodiments.
Figure 14C:
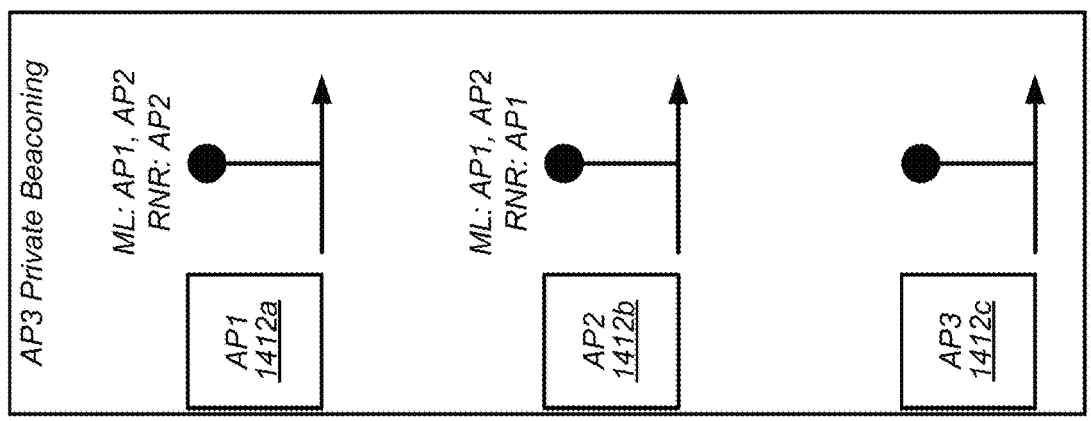
Figure 14B:
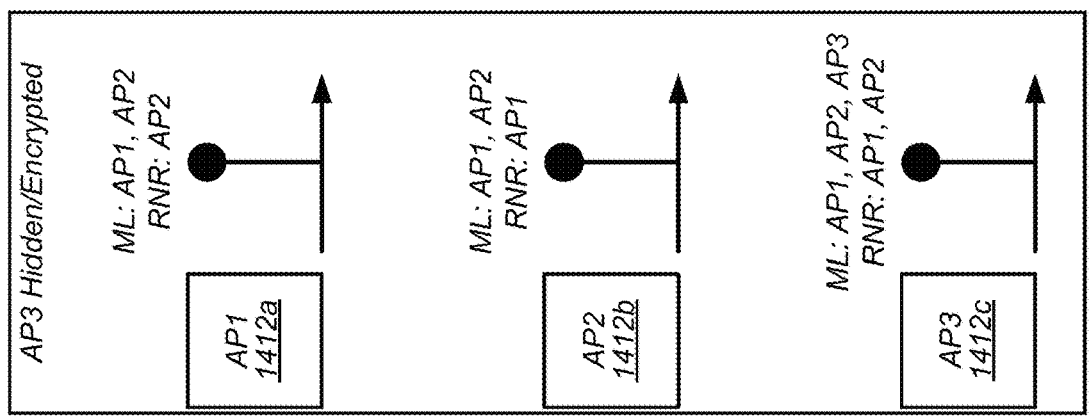
Figure 14A:
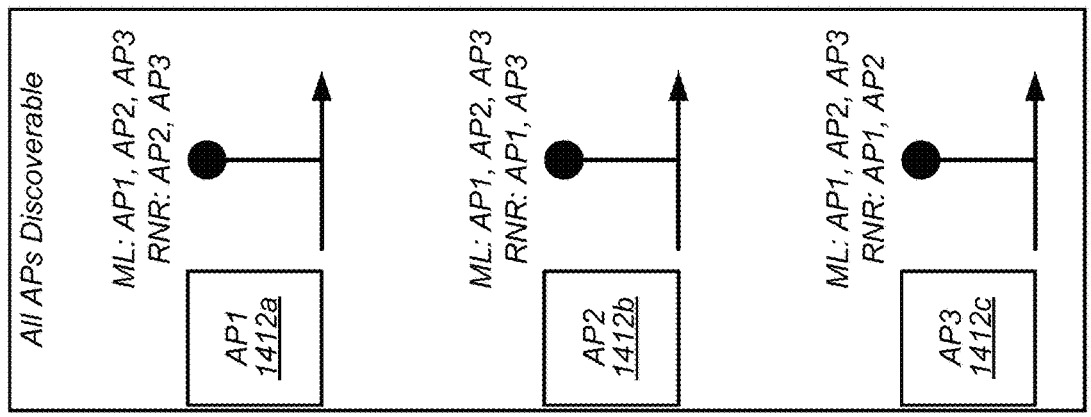

For example, FIGS. 14A-14D illustrate examples of various beaconing modes for APs affiliated in AP MLD, according to some embodiments. As shown in FIG. 14A, when all APs are in a default beaconing mode, beacons from AP1 1412*a* may include a ML indicator with values for AP1 1412*a*, AP2 1412*b*, and AP3 1412*c* and an RNR indicator with values for AP2 1412*b* and AP3 1412*c*. Similarly, beacons from AP2 1412*b* may include a ML indicator with values for AP1 1412*a*, AP2 1412*b*, and AP3 1412*c* and an RNR indicator with values for AP1 1412*a* and AP3 1412*c*. Further, beacons from AP3 1412*c* may include a ML indicator with values for AP1 1412*a*, AP2 1412*b*, and AP3 1412*c* and an RNR indicator with values for AP1 1412*a* and AP2 1412*b*. As shown in FIG. 14B, AP3 1412*c* may be in a hidden/encrypted beaconing mode. Thus, beacons from AP1 1412*a* may include a ML indicator with values for AP1 1412*a* and AP2 1412*b* but not AP3 1412*c* and an RNR indicator with a value for AP2 1412*b*. Similarly, beacons from AP2 1412*b* may include a ML indicator with values for AP1 1412*a* and AP2 1412*b* but not AP3 1412*c* and an RNR indicator with a value for AP1 1412*a*. Further, beacons from AP3 1412*c* may include a ML indicator with values for AP1 1412*a*, AP2 1412*b*, and AP3 1412*c* and an RNR indicator with values for AP1 1412*a* and AP2 1412*b*. As shown in FIG. 14C, AP3 1412*c* may be in a private beaconing mode. Thus, beacons from AP1 1412*a* may include a ML indicator with values for AP1 1412*a* and AP2 1412*b* but not AP3 1412*c* and an RNR indicator with a value for AP2 1412*b*. Similarly, beacons from AP2 1412*b* may include a ML indicator with values for AP1 1412*a* and AP2 1412*b* but not AP3 1412*c* and an RNR indicator with a value for AP1 1412*a*. Further, beacons from AP3 1412*c* may not include an ML indicator or an RNR indicator. As shown in FIG. 14D, AP3 may not be transmitting a beacon. Thus, beacons from AP1 1412*a* may include a ML indicator with values for AP1 1412*a* and AP2 1412*b* but not AP3 1412*c* and an RNR indicator with a value for AP2 1412*b*. Similarly, beacons from AP2 1412*b* may include a ML indicator with values for AP1 1412*a* and AP2 1412*b* but not AP3 1412*c* and an RNR indicator with a value for AP1 1412*a*.

Figure 15:
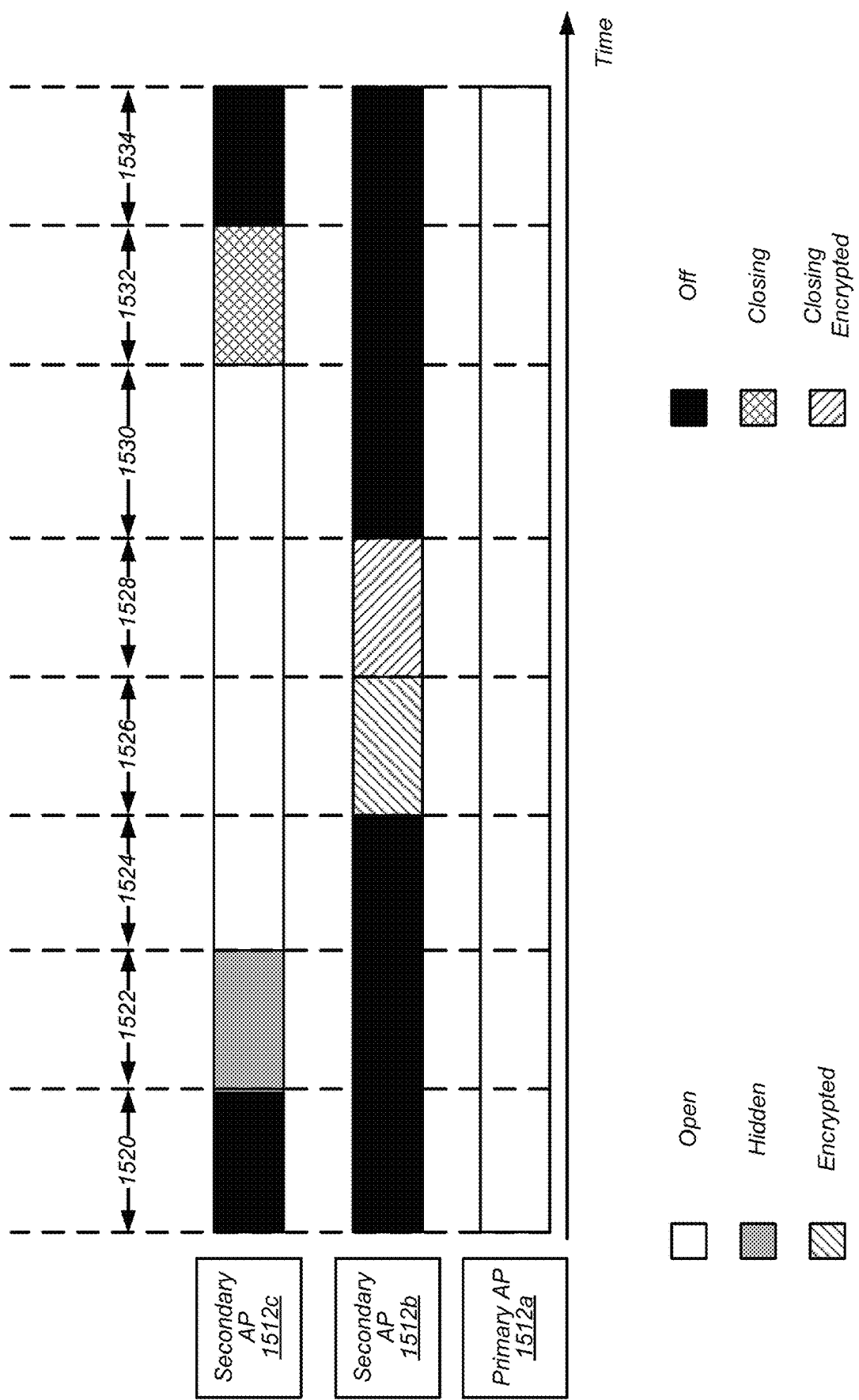
FIG. 15 illustrates an example of AP beaconing, according to some embodiments.

FIG. 15 illustrates an example of AP beaconing, according to some embodiments. As shown, at 1520, a primary AP 1512*a* may remain in an open phase of operation during addition of one or more APs (e.g., secondary APs 1512*b* and 1512*c*). During 1520, APs 1512*b* and 1512*c* may be off and AP 1512*a* may transmit beacons with only information associated with AP 1512*a*.

At 1522, AP 1512*c* may transition to a hidden mode of operation while AP 1512*b* remains off. During 1522, AP 1512*a* may transmit beacons with only information associated with AP 1512*a* (e.g., AP 1512*a* does not include information such as RNR and ML elements associated with AP 1512*c*). However, AP 1512*c* may transmit beacons with information associated with AP 1512*c* as well as AP 1512*a* (e.g., RNR and ML elements associated with AP 1512*a*).

At 1524, AP 1512*c* may transition to an open mode of operation while AP 1512*b* remains off. During 1524, AP 1512*a* may transmit beacons with information associated with AP 1512*a* as well as AP 1512*c* (e.g., RNR and ML elements associated with AP 1512*c*). Similarly, AP 1512*c* may transmit beacons with information associated with AP 1512*c* as well as AP 1512*a* (e.g., RNR and ML elements associated with AP 1512*a*).

At 1526, AP 1512*b* may transition to an encrypted mode of operation. During 1526, AP 1512*a* may transmit beacons with information associated with AP 1512*a* as well as AP 1512*c* (e.g., RNR and ML elements associated with AP 1512*c*). Similarly, AP 1512*c* may transmit beacons with information associated with AP 1512*c* as well as AP 1512*a* (e.g., RNR and ML elements associated with AP 1512*a*). AP 1512*b*, however, may transmit beacons with information associated with AP 1512*a* (e.g., RNR and ML elements associated with AP 1512*a*). and AP 1512*c* (e.g., RNR and ML elements associated with AP 1512*c*). Note that AP 1512*b* may not include such information in probe responses.

At 1528, AP 1512*b* may transition to an encrypted closing mode of operation. During 1528, AP 1512*a* may transmit beacons with information associated with AP 1512*a* as well as AP 1512*c* (e.g., RNR and ML elements associated with AP 1512*c*). Similarly, AP 1512*c* may transmit beacons with information associated with AP 1512*c* as well as AP 1512*a* (e.g., RNR and ML elements associated with AP 1512*a*). AP 1512*b*, however, may transmit beacons with information associated with AP 1512*a* (e.g., RNR and ML elements associated with AP 1512*a*). and AP 1512*c* (e.g., RNR and ML elements associated with AP 1512*c*). Note that AP 1512*b* may not include such information in probe responses. Additionally, during 1528, AP 1512*b* may signal that it will close down.

At 1530, AP 1512*b* may transition to off. During 1530, AP 1512*a* may transmit beacons with information associated with AP 1512*a* as well as AP 1512*c* (e.g., RNR and ML elements associated with AP 1512*c*). Similarly, AP 1512*c* may transmit beacons with information associated with AP 1512*c* as well as AP 1512*a* (e.g., RNR and ML elements associated with AP 1512*a*).

At 1532, AP 1512*c* may transition to a closing mode of operation. During 1532, AP 1512*a* may transmit beacons with information associated with AP 1512*a* as well as an indication that AP 1512*c* will close down. Similarly, AP 1512*c* may transmit beacons with information associated with AP 1512*c* as well as AP 1512*a* (e.g., RNR and ML elements associated with AP 1512*a*). Additionally, during 1532, AP 1512*c* may signal that it will close down.

At 1534, AP 1512*c* may transition to off. During 1534, AP 1512*a* may transmit beacons with only information associated with AP 1512*a*.

FIG. 16 further illustrates distinctions for various AP operational modes, according to some embodiments. As shown, and as described herein, an AP of an AP MLD operating in a default (and/or legacy) mode of operation may be discoverable via any of the APs in the AP MLD. Additionally, AP and link quality assessment may occur across all links or via an ML probe request. Additionally, when operating in a default mode, all links may be setup in a 1-phase setup. Further, as described herein, an AP of an AP MLD operating in a hidden mode of operation may only be discoverable on its link (e.g., a hidden AP is not discoverable via a link to another AP in the AP MLD). Additionally, AP and link quality assessment may be slow as compared to default operation and only a link to primary AP may be assessed with secondary APs likely being setup in a post association state. Further, an AP of an AP MLD operating in an encrypted mode and/or not transmitting beacons may not be discoverable, e.g., only a primary AP may be discoverable. AP and link quality assessment may only be performed with the primary AP with secondary APs being assess in a post-associated state. Further secondary APs may be setup only in a post association state.

In some embodiments, a wireless station in non-AP MLD may query available APs in an AP MLD via a robust multilink (ML) Query procedure. The ML Query may identify a requested AP and/or the ML Query may request information of all APs in the AP MLD. The requested AP may be transmitting hidden, encrypted and/or private beacons. In such cases, an AP in the AP MLD may transmit a unicast robust ML Query response to the wireless station and provide AP parameters for the requested AP. Alternatively, if and/or when the AP does not want the wireless station to find the requested AP and add a link to the requested AP, the AP may not respond with unicast robust ML Query response. Additionally, the AP may not provide any information of the requested AP.

In some embodiments, a soft AP of an AP MLD may have secondary AP(s) that operate in the 5 and/or 6 GHz bands, where a soft AP may be a mobile phone/tablet/laptop that may switch to operate as an AP. Typically, a soft AP does not operate secondary AP(s), unless traffic load requires more capacity. However, a soft AP may dynamically add or delete secondary APs. Note that a discoverable secondary AP may operate in active mode and may be included to beacons transmitted by other APs whereas a hidden secondary AP may operate in a power save mode and/or have other limitations (e.g., as further described herein). In some embodiments, although all APs of an infrastructure AP MLD may be typically available all the time, an AP MLD may temporarily disable AP, e.g., if traffic load is high and/or if the AP needs to do measurements and/or other operations. Infrastructure APs may be independent and there may be no primary AP. Further, infrastructure APs may be simultaneous TX and RX capable, e.g., they may transmit and receive independently.

In some embodiments, APs that serve legacy wireless stations may be required to select a default mode of operation in which beacons are transmitted on all links, the AP is always available, and the AP is capable of simultaneous TX and RX. In some embodiments, a hidden AP may transmit selected group frames, may be available based on TWT schedule, and may be not be capable of simultaneous TX and RX. Note that an AP operating as a hidden AP may operate with any of the above features (e.g., may operate as a default AP) if the hidden AP has only associated with non-AP MLDs that support the operation.

BSS transition management (BTM) signaling may allow an AP to propose BSS transition to an associated wireless station (STA). A non-AP STA may send a BTM query to an AP to query candidate APs from its associated APs. An associated AP may send a BTM request to propose transition to an AP for the STA. the STA may respond with a BTM response to accept and/or reject the proposed transition. In some embodiments, the BTM request may be sent to a non-AP MLD. For example, an AP MLD may send a BTM request to an associated non-AP MLD to request MLD/BSS transition to another AP/AP MLD, a new link addition to the associated AP MLD, and/or to disassociate a link/AP from the associated AP MLD. For a request for MLD/BSS transition to another AP/AP MLD, the non-AP MLD may perform a 4-way handshake and current links may be deleted and new links to the new AP MLD may be created. For a new link addition to the associated AP MLD, the AP MLD may signal to the STA that it has a new AP and the new AP may not be not discoverable for all STAs. Additionally, the BTM request may be the only mechanism to discover the new AP, at least in some embodiments. For a request to disassociate a link/AP from the associated AP MLD, the AP may shut down and the AP MLD may request that the STA stop using the AP.

Figure 17:
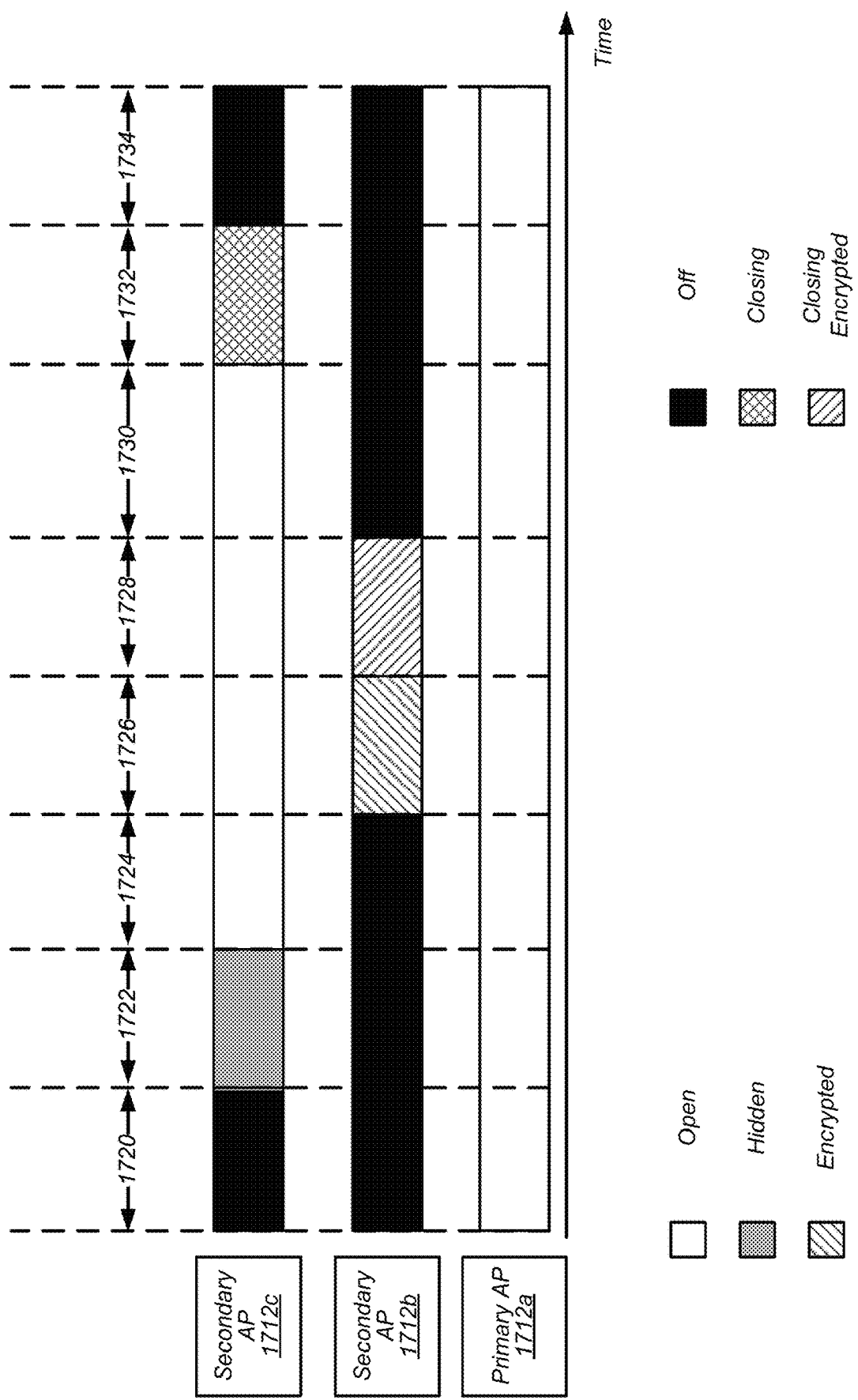
FIG. 17 illustrates an example of BSS transition management usage, according to some embodiments.

FIG. 17 illustrates an example of BSS transition management usage, according to some embodiments. As shown, at 1720, a primary AP 1712a may remain in an open phase of operation during addition of one or more APs (e.g., secondary APs 1712b and 1712c). During 1720, APs 1712b and 1712c may be off and AP 1712a may transmit beacons with only information associated with AP 1712a. AP 1712a may not transmit BTM frames.

At 1722, AP 1712c may transition to a hidden mode of operation while AP 1712b remains off. During 1722, AP 1712a may transmit BTM requests to selected STAs. The BTM request frames may include an indication of a request for legacy STAs to transition to AP 1712c. Additionally, the BTM frames may include an indication of a request to non-AP MLDs to add a link to AP 1712c. Further, AP 1712a may transmit beacons with only information associated with AP 1712a (e.g., AP 1712a does not include information such as RNR and ML elements associated with AP 1712c). However, AP 1712c may transmit beacons with information associated with AP 1712c as well as AP 1712a (e.g., RNR and ML elements associated with AP 1712a).

At 1724, AP 1712c may transition to an open mode of operation while AP 1712b remains off. During 1724, AP 1712a may transmit beacons with information associated with AP 1712a as well as AP 1712c (e.g., RNR and ML elements associated with AP 1712c). Similarly, AP 1712c may transmit beacons with information associated with AP 1712c as well as AP 1712a (e.g., RNR and ML elements associated with AP 1712a).

At 1726, AP 1712b may transition to an encrypted mode of operation. During 1726, APs 1712a and 1712c may transmit BTM request to selected stations. The BTM frames may be transmitted to selected non-AP MLDs and may include an indication of a request to add a link to AP 1712b. Further, AP 1712a may transmit beacons with information associated with AP 1712a as well as AP 1712c (e.g., RNR and ML elements associated with AP 1712c). Similarly, AP 1712c may transmit beacons with information associated with AP 1712c as well as AP 1712a (e.g., RNR and ML elements associated with AP 1712a). AP 1712b, however, may transmit beacons with information associated with AP 1712a (e.g., RNR and ML elements associated with AP 1712a). and AP 1712c (e.g., RNR and ML elements associated with AP 1712c). Note that AP 1712b may not include such information in probe responses.

At 1728, AP 1712b may transition to an encrypted closing mode of operation. During 1728, APs 1712a, 1712b, and 1712c may transmit BTM requests. The BTM frames may be transmitted to non-AP MLDs that have a link with AP 1712b and may include an indication that AP 1712b will close. Further, AP 1712a may transmit beacons with information associated with AP 1712a as well as AP 1712c (e.g., RNR and ML elements associated with AP 1712c). Similarly, AP 1712*c* may transmit beacons with information associated with AP 1712*c* as well as AP 1712*a* (e.g., RNR and ML elements associated with AP 1712*a*). AP 1712*b*, however, may transmit beacons with information associated with AP 1712*a* (e.g., RNR and ML elements associated with AP 1712*a*). and AP 1712*c* (e.g., RNR and ML elements associated with AP 1712*c*). Note that AP 1712*b* may not include such information in probe responses.

At 1730, AP 1712*b* may transition to off. During 1730, AP 1712*a* may transmit beacons with information associated with AP 1712*a* as well as AP 1712*c* (e.g., RNR and ML elements associated with AP 1712*c*). Similarly, AP 1712*c* may transmit beacons with information associated with AP 1712*c* as well as AP 1712*a* (e.g., RNR and ML elements associated with AP 1712*a*).

At 1732, AP 1712*c* may transition to a closing mode of operation. During 1732, APs 1712*a* and 1712*c* may transmit BTM requests. BTM frames transmitted to legacy non-AP STAs associated with AP 1712*c* may include an indication to move to AP 1712*a*. BTM frames transmitted to non-AP MLDs that have a link with AP 1712*c* may include an indication that AP 1712*c* will close. Further, AP 1712*a* may transmit beacons with information associated with AP 1712*a* as well as an indication that AP 1712*c* will close down. Similarly, AP 1712*c* may transmit beacons with information associated with AP 1712*c* as well as AP 1712*a* (e.g., RNR and ML elements associated with AP 1712*a*).

At 1734, AP 1712*c* may transition to off. During 1734, AP 1712*a* may transmit beacons with only information associated with AP 1712*a*. Note that in each of the above phases 1720-1732, available APs may respond to BTM queries of associated STAs.

FIG. 18 illustrates a request mode field of a BTM request, according to some embodiments. As shown the request mode field may include a preferred candidate list included field (e.g., to indicate that a preferred candidate list is included in the BTM request), an abridged field, a disassociation imminent field, a BSS termination included field, and ESS dissociation imminent field, an AP MLD termination included field, a New AP to be added field, and a reserved field. In some embodiments, each field may be 1 bit. In some embodiments, when an AP MLD makes a new AP discoverable to all STAs at the same time, then all associated non-AP MLDs may add a link to the new AP at the same time, which may cause a management frame storm. In some embodiments, to mitigate management frame storms, an AP MLD may signal the new AP availability only to selected STAs by using a BTM request frame, e.g., as described herein. In some embodiments, the BTM request may propose STAs to create a link to the new AP, e.g., via the request mode New AP to be added field. For example, the BTM request may set a New AP To Be Added field of the request mode field to a value of 1, e.g., to request that the STA creates a link to the AP listed in the candidate list. The AP in the candidate list may not be included in an RNR and ML element to avoid link add storms. The new AP may send a beacon and respond to probe requests. Additionally, a Validity Interval field of the BTM request may signal a number of TBTTs until the new AP is added to all beacons.

In some embodiments, a BTM request may indicate AP MLD/BSS termination. In some embodiments, the BTM request can signal BSS Termination Included signals that the transmitting AP is shutting down. Thus, when an AP MLD transmits the BTM request with this field set to 1, the AP in AP MLD may shut down. Additionally, an AP MLD Termination Included field set to a value of 1 may signal that the AP MLD with all its APs will shut down.

In some embodiments, a non-AP MLD may send a response to the BTM request via a BTM response. In the BTM response, the non-AP MLD may indicate acceptance or rejection of the BTM request. In some embodiments, the BTM response does not terminate and/or perform AP MLD transition. In other words, link add/fast MLD transition/link delete signaling may be required to be separately signaled.

In some embodiments, the AP MLD may send a BTM request that indicates AP termination to all non-AP MLDs that have a link with the AP/BSS that is terminating and to all non-AP STAs that may be associated with the AP/BSS that is terminating. The AP MLD may receive a response from all associated non-AP STAs and from all non-AP MLDs that have a link with the AP/BSS before it terminates the AP/BSS.

In some embodiments, the AP MLD may signal, e.g., in beacon frames, that an AP in AP MLD will be closing. The AP MLD may signal long duration, multiple DTIM beacon intervals, or beacon intervals, after which the AP/BSS will be terminated. The AP may signal AP termination at least for the longest Listening Interval of all associated STAs and non-AP MLDs. A STA and/or non-AP MLD may receive at least one beacon within its Listening Interval. The Listening Interval value may typically be signaled in association. The broadcasted termination indication may be useful, e.g., if the AP has a link with many STAs affiliated with non-AP MLDs and unicast BTM request/response signaling would cause high signaling overhead.

In some embodiments, different bands may have different minimum durations for the AP/BSS. For example, UNII-2 bands in 5 GHz may signal BSS termination for a shorter time. This time may be similar to durations of the channel switch announcements when radar is detected in the band.

In some embodiments, a beacon transmission mode may define a minimum time an AP is required to signal a BSS termination duration. For instance, if the BSS transmits in hidden or encrypted mode, the minimum duration to signal AP termination may be shorter than in default/legacy beaconing mode.

In some embodiments, an AP may transmit broadcast BTM request frames to signal that AP/BSS in AP MLD will be terminated. This signaling may be understood by legacy STAs. Note that if a STA receives such broadcast BTM request, but desires to continue operating in the AP, e.g., opposes AP termination, the STA may send a unicast BTM response with status code reject for the AP termination. Further, if the AP termination is acceptable for the non-AP MLD, it may send a link delete message to terminate the link and/or send a unicast BTM response with status code accept or do nothing.

In some embodiments, an AP may be terminated earlier, e.g., if it does not have any associated STAs or links to AP MLD. This may happen if all non-AP MLDs delete their links to the AP and legacy STAs disassociate from the AP.

In some embodiments, the AP MLD may send in beacon frames and send unicast and/or broadcast BTM request messages to signal that it is terminating AP/BSS. In some embodiments, an AP may perform both signaling in parallel to ensure that STAs do not miss AP termination indication.

In some embodiments, a non-AP MLD may transmit a BTM query frame, e.g., if the non-AP MLD does not know the available APs in AP MLD and/or if the non-AP MLD wants to query for APs and/or AP MLDs that network recommends for the STA. The non-AP MLD may also send an ML Query Request, e.g., if the non-AP MLD is interested to operate with the responding AP MLD. In other words, the non-AP MLD may also send an ML Query Request if the non-AP MLD does not want to change association to other AP or AP-MLD. The AP MLD may respond with ML Query response that contains similar information as the BTM Request as describe above. The AP may not provide all information to all requesting STAs, e.g., if the AP MLD does not desire the non-AP MLD to be aware of some of its APs, it may not provide information associated with those APs. The content of the AP ML Query responses may change over time, as well.

In some embodiments, AP MLD may send BTM request to specific non-AP MLD and request a link termination. The AP may use a disassociation imminent field to signal that the whole non-AP MLD is disassociated, unless the non-AP MLD terminates the link to the AP.

In some embodiments, the AP may send unicast link termination signaling to STA to indicate that it has terminated a link of the non-AP MLD. After this indication, the STA may need to add a link or associate with the link in order to use the link for transmission or reception of data.

In some embodiments, an AP may transmit a BTM request to a STA to request the STA to operate in another link and/or the AP may terminate a specific link, e.g., if the STA's link performance is very poor on the link (e.g., transmission rates are poor, AP may not get acknowledgements to DL frames it transmits, STA needs to retransmit multiple times its frames, etc.). Alternatively, the AP may terminate a link from the STA that uses a lot (e.g., a large portion) of transmission time. For example, a non-AP MLD transmits all its traffic in 2.4 GHz and does not use 5 GHz link that would have much higher transmission capacity.

Figure 19:
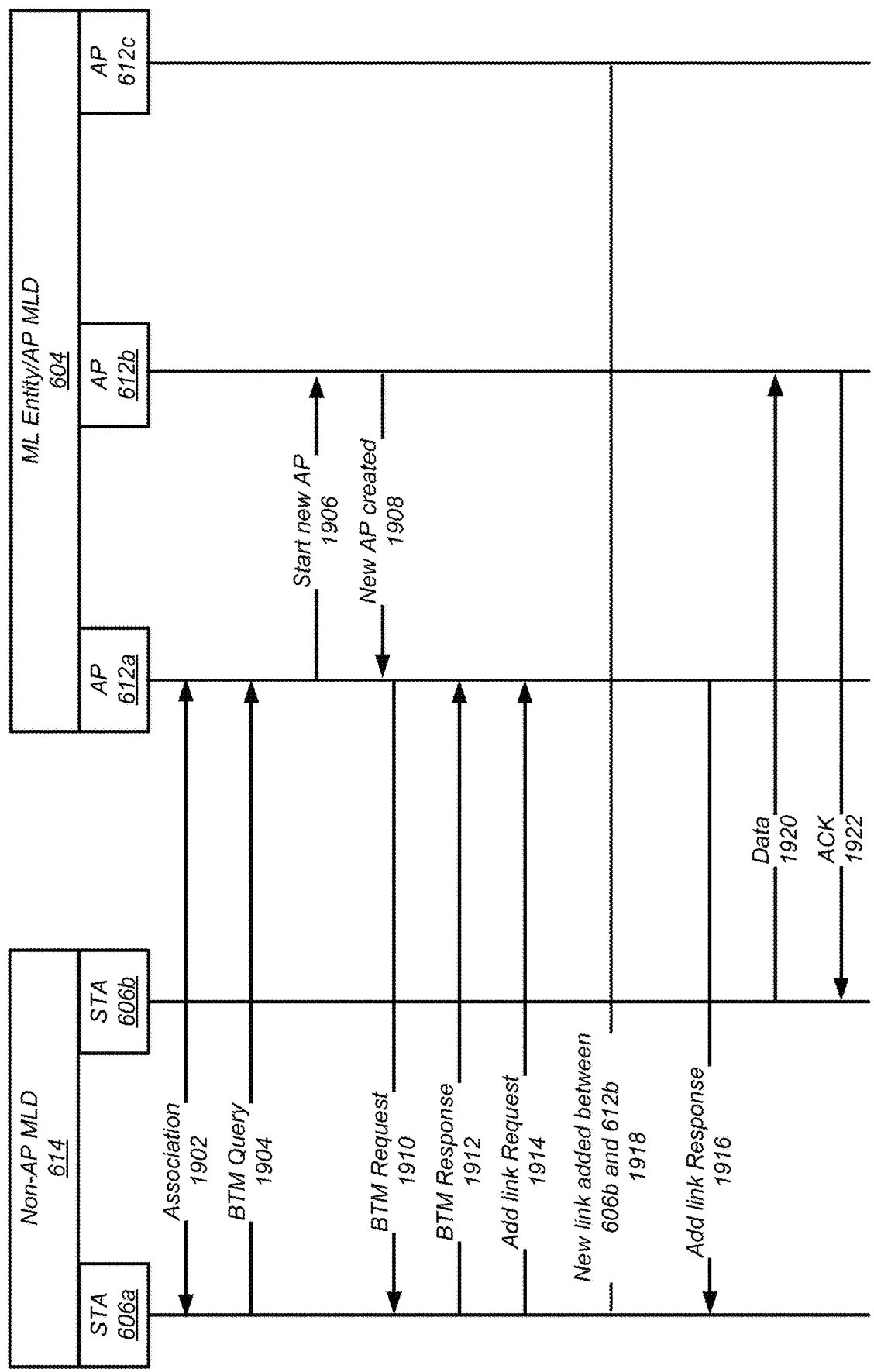
FIG. 19 illustrates an example of signaling for using a BTM query to add a new AP and/or request a new AP, according to some embodiments.

In some embodiments, a BTM query may be used to add a new AP and/or request a new AP. For example, FIG. 19 illustrates an example of signaling for using a BTM query to add a new AP and/or request a new AP, according to some embodiments. The signaling shown in FIG. 19 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, STA 606a may associated with AP 612a via signaling 1902, e.g., as described herein. Note that STA 606b may not be associated and AP 612b may not be operating. STA 606a (e.g., an associated non-AP STA/MLD) may send a BTM query frame 1904 to AP 612a to propose that AP MLD 614 adds a new AP (e.g., AP 612b) on a specific channel. The BTM query frame 1904 may include an indication to add the new AP and a candidate BSS. In some embodiments, the BTM query frame 1904 may include a request mode field with a new AP to be added field set to a value of 1 to indicate the request for the new AP creation. In some embodiments, STA 606a (e.g., the non-AP MLD) may create an AP and provide its parameters to the STA/non-AP MLD (e.g., AP 612a). AP 612a may send a start new AP in AP MLD request 1906 to AP 612b and include AP MLD parameters. AP 612b may send a new AP created response 1908 to AP 612a and include AP MLD parameters. AP 612a may then send a BTM request 1910 to STA 606a. The BTM request 1910 may include a candidate BSS list that includes AP 612b. STA 606a may send a BTM response 1912 indicating successful receipt of the BTM request. STA 606a may then send an add link request 1914 requesting addition of a link between STA 606b and AP 612b. AP 612a may send a add link response 1916 indicating the addition of the link between STA 606b and AP 612b. At 1918 the link may be added. STA 602b may then send data (e.g., MPDUs) 1920 to AP 612b and AP 612b may send acknowledgment 1922 to STA 606b.

In some embodiments, a non-AP MLD may delete a link between a STA and an AP. For example, a non-AP MLD may delete a link by sending a robust delete link frame to an AP. Note that when a link is deleted, the link cannot be used to send data and the non-AP MLD does not maintain link specific keys and/or parameters.

Figure 20:
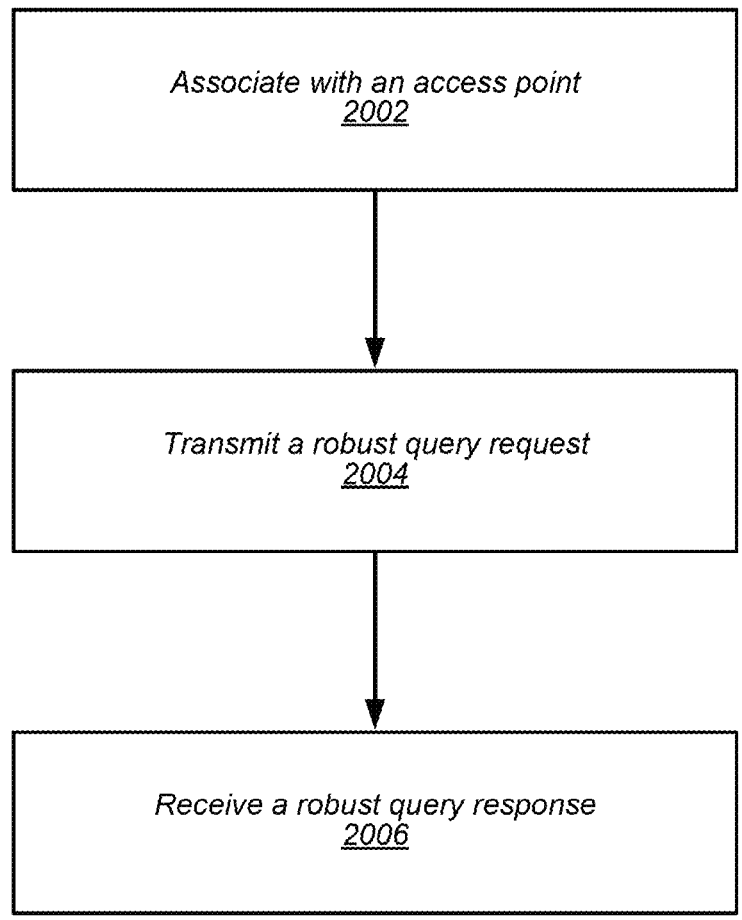
FIG. 20 illustrates a block diagram of an example of a method for performing secure multilink scanning, according to some embodiments.

FIG. 20 illustrates a block diagram of an example of a method for performing secure multilink scanning, according to some embodiments. The method shown in FIG. 20 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2002, a wireless station or wireless device, such as wireless station 106, may associate with an access point, such as access point 112. The access point may be included in and/or associated with a multi-link device (MLD).

At 2004, the wireless station may transmit, to the access point, a robust query request. Note that as used herein, the adjective "robust" may refer to a type of wireless communication that can withstand intentional or unintentional disturbances, such as technical faults, signal disturbances, and/or security threats. Thus, a robust query request may be considered a query request that can withstand intentional or unintentional disturbances, such as technical faults, signal disturbances, and/or security threats. In some instances, the robust query request may query for available access points within the MLD and/or for parameters associated with the MLD At 2006, the wireless station may receive, from the access point a robust query response. Note that a robust query response may be considered a query request that can withstand intentional or unintentional disturbances, such as technical faults, signal disturbances, and/or security threats. In some instances, the robust query response may include an integrity protected broadcast probe response. The integrity protected broadcast probe response may include a medium access control (MAC) Management Encapsulation element (MME). The MME may include at least one of (e.g., any combination of, including one or more of and/or all of) an element identifier (ID), a length field, a key ID field, a Beacon Integrity Packet Number (BIPN) field, a probe response integrity packet number (PRPN) field, and/or a message integrity check (MIC) field. In some instances, the robust query response may use a temporal key and/or packet number for verification. For example, the robust query response may use a Beacon Integrity Group Temporal Key (BIGTK) for verification. In such instances, the BIGTK may additionally be used for beacon integrity verification. As another example, the robust query response may use a Beacon Integrity Packet Number (BIPN). In such instances, the BIPN may be additionally used for beacons. As a further example, the robust query response may use a probe response integrity packet number (PRPN). In such instances, the PRPN may be from a PRPN used for beacons.

In some instances, the wireless station may calculate an integrity check sum over the entire robust query response. In such instances, a timestamp field included in the robust query response may be masked prior to calculating the integrity check sum, e.g., may not be included in the integrity check sum.

Figure 21:
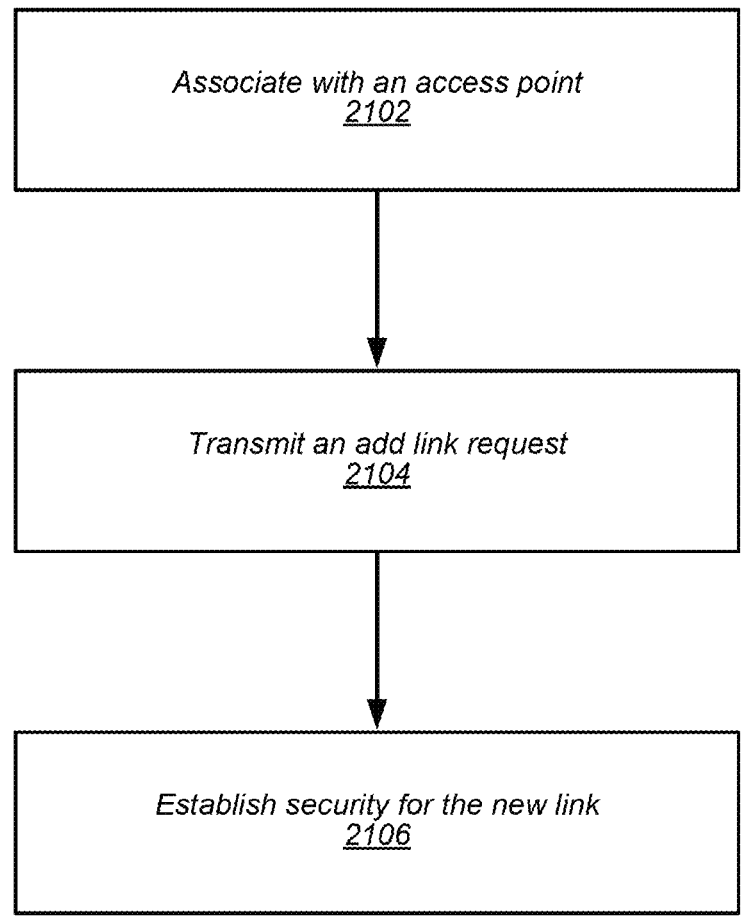
FIG. 21 illustrates a block diagram of an example of a method for providing a Group Temporal Key (GTK) for a new link, according to some embodiments.

FIG. 21 illustrates a block diagram of an example of a method for providing a Group Temporal Key (GTK) for a new link, according to some embodiments. The method shown in FIG. 21 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, a wireless station or wireless device, such as wireless station 106, may associate with an access point, such as access point 112. The access point may be included in and/or associated with a multi-link device (MLD).

At 2104, the wireless station may transmit, to the access point, an add link request. The add link request may request an addition of a new link between the wireless station and the access point. The add link request may be and/or may include a robust add link request. Note that as used herein, the adjective "robust" may refer to and/or describe a type of wireless communication that can withstand intentional or unintentional disturbances, such as technical faults, signal disturbances, and/or security threats. Thus, a robust add link request may be considered an add link request that can withstand intentional or unintentional disturbances, such as technical faults, signal disturbances, and/or security threats. In some instances, the add link request may include a set of non-access point station (e.g., a set of wireless station) parameters and a set of access point parameters. In some instances, the add link request may include a power mode (PM) for the new link. In some instances, the add link request may include multilink attributes. The multilink attributes may specify whether the wireless station is capable of simultaneous transmission/reception on multiple links.

At 2106, the wireless station may establish, with the access point, security for the new link, including one or more of (e.g., any combination of, including at least one of and/or all of) of a Beacon Integrity GTK (BIGTK) secure architecture (BIGTKSA), an Integrity GTK secure architecture (IGTKSA), a GTK secure architecture (GTKSA), or a peer wise transient key (PTK) secure architecture (PTKSA) for the added new link. The add link response may be and/or may include a robust add link response. Note that as used herein, the adjective "robust" may refer to and/or describe a type of wireless communication that can withstand intentional or unintentional disturbances, such as technical faults, signal disturbances, and/or security threats. Thus, a robust add link response may be considered an add link response that can withstand intentional or unintentional disturbances, such as technical faults, signal disturbances, and/or security threats. In some instances, the add link response may indicate that the new link between the wireless station and the access point will be added.

In some instances, to establish security for the new link with the access point, the wireless station may perform a 4-way handshake procedure with the access point. In some instances, to establish security for the new link with the access point, the wireless station may transmit, to the access point, a robust re-association request and may receive, from the access point, a robust re-association response. In some instances, to establish security for the new link with the access point, the wireless station may transmit, to the access point, an authentication request and may receive, from the access point, an authentication response.

Figure 22:
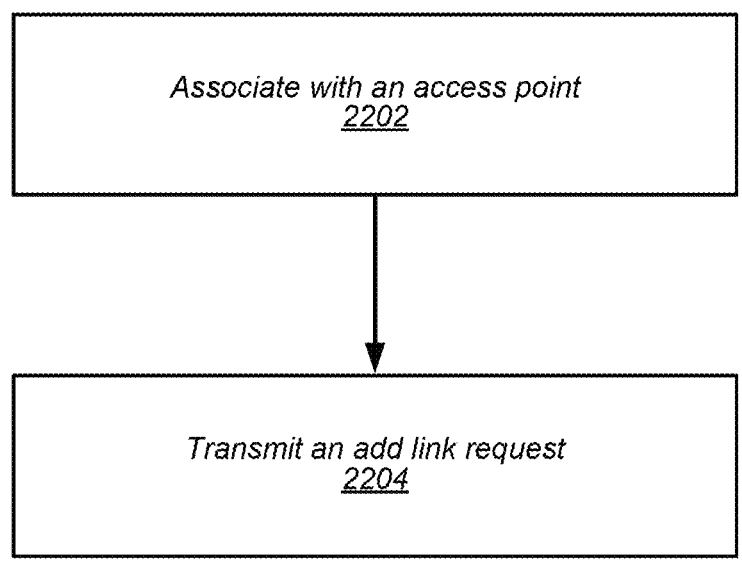
FIG. 22 illustrates a block diagram of an example of a method for randomizing a medium access control (MAC) address of a wireless station, according to some embodiments.

FIG. 22 illustrates a block diagram of an example of a method for randomizing a medium access control (MAC) address of a wireless station, according to some embodiments. The method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, a wireless station or wireless device, such as wireless station 106, may associate with an access point, such as access point 112. The access point may be included in and/or associated with a multi-link device (MLD).

At 2204, the wireless station may transmit, to the access point, an add link request. The add link request may indicate a MAC address associated with a link, a new MLD MAC address sequence number offset, and a timing synchronization function (TSF) of an update to the MAC address. The add link request may be and/or may include a robust add link request. Note that as used herein, the adjective "robust" may refer to and/or describe a type of wireless communication that can withstand intentional or unintentional disturbances, such as technical faults, signal disturbances, and/or security threats. Thus, a robust add link request may be considered an add link request that can withstand intentional or unintentional disturbances, such as technical faults, signal disturbances, and/or security threats. In some instances, the add link request may indicate an uplink traffic identifier (ID) and a downlink traffic ID. In some instances, the sequence number offset may be randomized.

In some instances, the wireless station may receive, from the access point, an add link response. The add link response may indicate the MAC address associated with the link, the new MLD MAC address sequence number offset, and the TSF of the update to the MAC address. The add link response may be and/or may include a robust add link response. Note that as used herein, the adjective "robust" may refer to and/or describe a type of wireless communication that can withstand intentional or unintentional disturbances, such as technical faults, signal disturbances, and/or security threats. Thus, a robust add link response may be considered an add link response that can withstand intentional or unintentional disturbances, such as technical faults, signal disturbances, and/or security threats.

Figure 23:
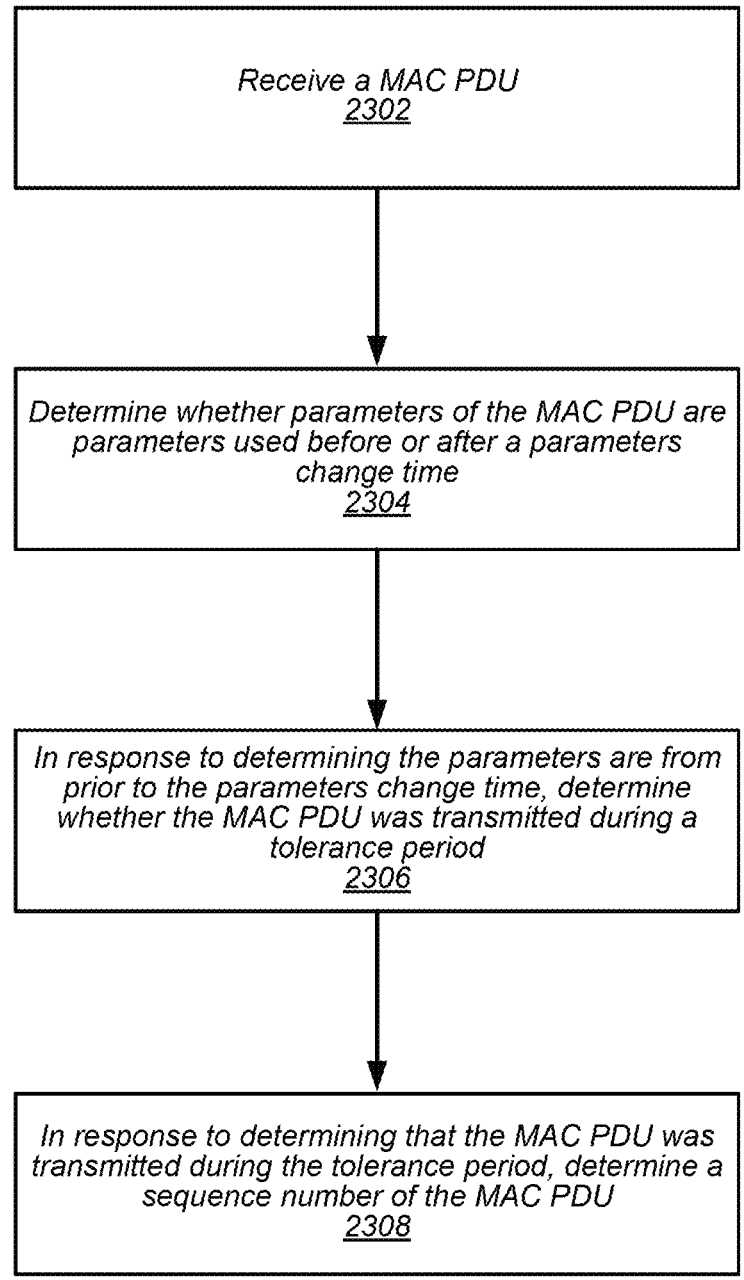
FIG. 23 illustrates a block diagram of an example of a method for selecting sequence number offsets for one or more sequence number spaces during an MLD parameters change, according to some embodiments.

FIG. 23 illustrates a block diagram of an example of a method for selecting sequence number offsets for one or more sequence number spaces during an MLD parameters change, according to some embodiments. The method shown in FIG. 23 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2302, an access point, such as access point 112, may receive, from a wireless station, such as wireless station 106, a MAC protocol data unit (PDU) over a link with the wireless station (e.g., a non-AP MLD).

At 2304, the access point may determine whether parameters associated with the MAC PDU are parameters used prior to a parameters change time or parameters used after the parameters change time.

At 2306, in response to determining that the parameters are parameters used prior to the parameters change time, the access point may determine whether the MAC PDU was transmitted during a tolerance period associated with the parameters change time.

At 2308, in response to determining that the MAC PDU was transmitted during the tolerance period, the access point may determine a sequence number of the MAC PDU using a sequence number offset associated with the parameters used prior to the parameters change time.

In some instances, in response to determining that the MAC PDU was transmitted after the tolerance period, the access point may discard the MAC PDU. In some instances, in response to determining that the parameters are parameters used after the parameters change time, the access point may determine a sequence number of the MAC PDU using a sequence number offset associated with the parameters used after the parameters change time.

Figure 24:
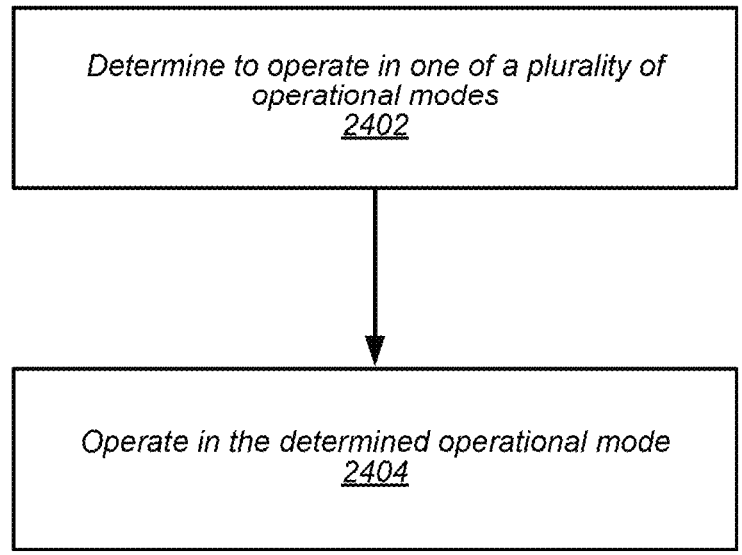
FIGS. 24 and 25 illustrate block diagrams of examples of methods of operating an access point of an MLD, according to some embodiments.
Figure 25:
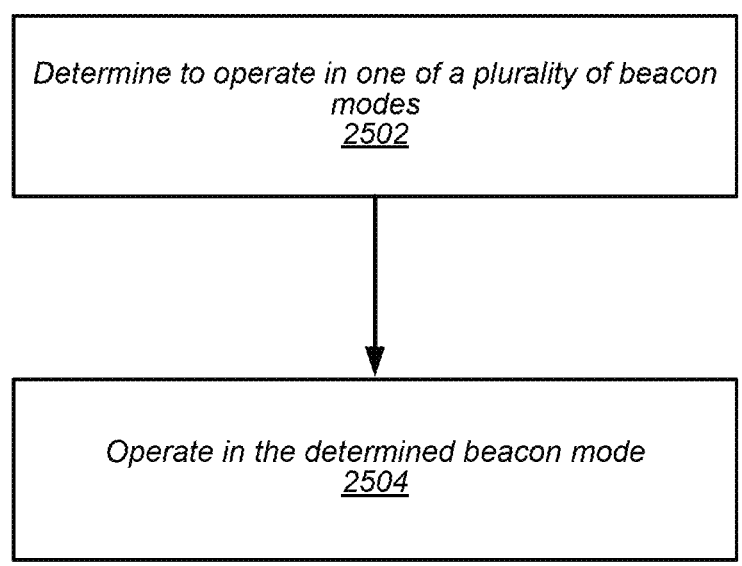

FIGS. 24 and 25 illustrate block diagrams of examples of methods of operating an access point of an MLD, according to some embodiments. The methods shown in FIGS. 24 and 25 may be used in conjunction with any of the systems, methods, or devices shown in the Figures, among other devices. In various embodiments, some of the method elements shown may be performed concurrently, in a different order than shown, or may be omitted. Additional method elements may also be performed as desired.

Turning to FIG. 24, as shown, this method may operate as follows.

At 2402, an access point, such as access point 112, may determine (e.g., based on a desired level of discoverability and/or a desired beacon mode) to operate in one of a plurality of operational modes. For example, in a first operational mode, the access point may be discoverable via any link of the MLD. As another example, in a second operational mode, the access point may be discoverable only on its primary channel. As a further example, in a third operational mode, the access point may be visible only to selected wireless stations that know the access point's beacon encryption key. As yet another example, in a fourth operational mode, the access point may be transitioning to an off phase and safely closing links.

At 2404, the access point may operate in a determined operational mode of the plurality of operational modes.

Turning to FIG. 25, as shown, this method may operate as follows.

At 2502, an access point, such as access point 112, may determine (e.g., based on a desired level of discoverability and/or a desired operational mode) to operate in one of a plurality of beacon modes. For example, in a first beacon mode, the access point may be discoverable via any link of the MLD. As another example, in a second beacon mode, the access point may be discoverable only on its primary channel. As a further example, in a third beacon mode, the access point may visible only to selected wireless stations that know the access point's beacon encryption key. As yet another example, in a fourth beacon mode, the access point may be transitioning to an off phase and safely closing links.

At 2504, the access point may operate in a determined beacon mode of the plurality of beacon modes.

Figure 26:
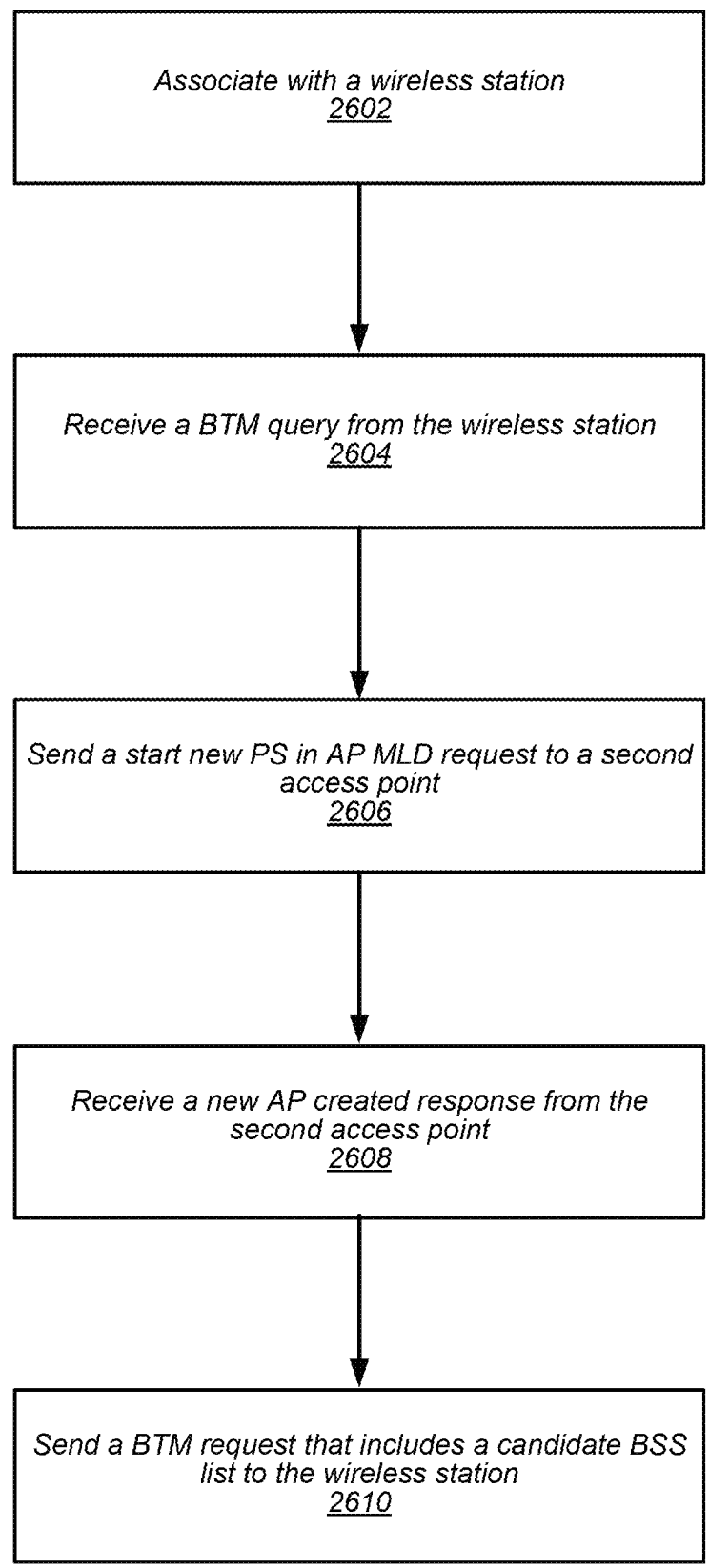
FIG. 26 illustrates a block diagram of an example of a method for using a basic service set (BSS) transition management (BTM) query to add a new access point to an MLD, according to some embodiments.

FIG. 26 illustrates a block diagram of an example of a method for using a basic service set (BSS) transition management (BTM) query to add a new access point to an MLD, according to some embodiments. The method shown in FIG. 26 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2602, an access point, such as access point 112, may associate with a wireless station. The access point may be included in a multi-link device (MLD).

At 2604, the access point may receive, from the wireless station, a BTM query. The BTM query may propose addition of a second access point to the MLD.

At 2606, the access point may send (or transmit), to the second access point, a start new access point (AP) in AP MLD request.

At 2608, the access point may receive, from the second access point, a new AP created response.

At 2610, the access point may send (or transmit), to the wireless station, a BTM request that includes a candidate BSS list. The candidate BSS list may include the second access point.

In some instances, the access point may receive, from the wireless device, an add link request and may send (or transmit) to the wireless device, an add link response. The add link response may indicate addition of the link to the second access point.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (and/or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio communicatively coupled to the antenna and configured to perform wireless communications; and
   at least one processor communicatively coupled to the at least one radio, wherein the at least one processor is configured to cause the wireless station to:
      transmit, to an access point comprised in a multi-link device (MLD), a robust add link request, wherein the add link request indicates a medium access control (MAC) address associated with a link, a new MLD MAC address sequence number offset, and a timing synchronization function (TSF) of an update to the MAC address; and
      receive, from the access point, a robust add link response, wherein the add link response indicates the MAC address associated with the link, the new MLD MAC address sequence number offset, and the TSF of the update to the MAC address.

2. The wireless station of claim 1,
   wherein the at least one processor is further configured to cause the wireless station to:
      transmit, to the access point, a robust query request; and
      receive, from the access point, a robust query response, wherein the robust query response includes available access points within the MLD and parameters associated with the MLD, wherein the robust query response comprises an integrity protected broadcast probe response, and wherein the integrity protected broadcast probe response includes a medium access control (MAC) Management Encapsulation element (MME).

3. The wireless station of claim 2,
   wherein the MME includes at least one of an element identifier (ID), a length field, a key ID field, a Beacon Integrity Packet Number (BIPN) field, a probe response integrity packet number (PRPN) field, or a message integrity check (MIC) field.

4. The wireless station of claim 2,
   wherein the at least one processor is further configured to cause the wireless station to:
      calculate an integrity check sum over the robust query response, wherein a timestamp field included in the robust query response is masked prior to calculating the integrity check sum.

5. The wireless station of claim 1,
   wherein the at least one processor is further configured to cause the wireless station to:
      transmit, to the access point, a robust query request; and
      receive, from the access point, a robust query response, wherein the robust query response includes available access points within the MLD and parameters associated with the MLD, and wherein the robust query response uses at least one of a temporal key or packet number for verification.

6. The wireless station of claim 5,
   wherein the temporal key includes a Beacon Integrity Group Temporal Key (BIGTK), and wherein the BIGTK is additionally used for beacon integrity verification.

7. The wireless station of claim 5,
   wherein the packet number includes a Beacon Integrity Packet Number (BIPN) that is additionally used for beacons or probe response integrity packet number (PRPN) that is distinct from a PRPN used for beacons.

8. The wireless station of claim 1,
   wherein the at least one processor is further configured to cause the wireless station to:
      transmit, to the access point, a robust query request, wherein the robust query request queries for the available access points within the MLD and parameters associated with the MLD.

9. The wireless station of claim 1,
   wherein the at least one processor is further configured to cause the wireless station to:
      establish, with the access point, security for the new link.

10. The wireless station of claim 9,
    wherein the security for the link includes one or more of a Beacon Integrity GTK (BIGTK) secure architecture (BIGTKSA), an Integrity GTK secure architecture (IGTKSA), a GTK secure architecture (GTKSA), or a peer wise transient key (PTK) secure architecture (PTKSA) for the new link.

11. The wireless station of claim 1,
    wherein the robust add link request includes one or more of:
      a set of non-access point station parameters and a set of access point parameters;
      a power mode (PM) for the new link; or
      multilink attributes that specify whether the wireless station is capable of simultaneous transmission/reception on multiple links.

12. The wireless station of claim 1,
    wherein the robust add link response indicates that the new-link between the wireless station and the access point will be added.

13. The wireless station of claim 9,
    wherein, to establish, with the access point, security for the new link, the at least one processor is further configured to cause the wireless station to perform at least one of:
      a 4-way handshake procedure with the access point;
      a robust re-association procedure, including:
         transmitting, to the access point, a robust re-association request; and
         receiving, from the access point, a robust re-association response; or
      a modified fast MLD transition signaling procedure, including:
         transmitting, to the access point, an authentication request; and
         receiving, from the access point, an authentication response.

14. An apparatus, comprising:
    a memory; and
    one or more processors in communication with the memory, wherein the one or more processors are configured to:
      generate instructions to transmit, to an access point comprised in a multi-link device (MLD), a robust add link request, wherein the add link request indicates a medium access control (MAC) address associated with a link, a new MLD MAC address sequence number offset, and a timing synchronization function (TSF) of an update to the MAC address; and
      receive, from the access point, a robust add link response, wherein the add link response indicates the MAC address associated with the link, the new MLD MAC address sequence number offset, and the TSF of the update to the MAC address.

15. The apparatus of claim 14,
wherein the robust add link request further indicates an uplink traffic identifier (ID) and a downlink traffic ID; and
wherein the new MLD MAC address sequence number offset is randomized.

16. A non-transitory computer readable memory medium storing program instructions executable by processing circuitry of an access point comprised in a multi-link device (MLD) to:
receive, from a wireless station associated with the access point, a robust add link request, wherein the robust add link request indicates a medium access control (MAC) address associated with a link, a new MLD MAC address sequence number offset, and a timing synchronization function (TSF) of an update to the MAC address; and
transmit, to the wireless station, a robust add link response, wherein the add link response indicates the MAC address associated with the link, the new MLD MAC address sequence number offset, and the TSF of the update to the MAC address.

17. The non-transitory computer readable memory medium of claim 16,
wherein the robust add link request further indicates an uplink traffic identifier (ID) and a downlink traffic ID.

18. The non-transitory computer readable memory medium of claim 16,
wherein the new MLD MAC address sequence number offset is randomized.

19. The apparatus of claim 14,
wherein the one or more processors are further configured to:
generate instructions to transmit, to the access point, a robust query request, wherein the robust query request queries for the available access points within the MLD and parameters associated with the MLD.

20. The apparatus of claim 14,
wherein the one or more processors are further configured to:
establish, with the access point, security for the link.

* * * * *

UNITED STATES PATENT AND TRADEMARK OFFICE
CERTIFICATE OF CORRECTION

PATENT NO. : 12,267,766 B2
APPLICATION NO. : 17/527873
DATED : April 1, 2025
INVENTOR(S) : Jarkko L. Kneckt et al.

Page 1 of 1

It is certified that error appears in the above-identified patent and that said Letters Patent is hereby corrected as shown below:

In the Claims

Column 36, Line 13, delete "new"

Column 36, Line 33, delete "new-"

Signed and Sealed this
Twenty-seventh Day of May, 2025

Coke Morgan Stewart
*Acting Director of the United States Patent and Trademark Office*